US008085438B2

(12) United States Patent
Hersch et al.

(10) Patent No.: US 8,085,438 B2
(45) Date of Patent: Dec. 27, 2011

(54) PRINTING COLOR IMAGES VISIBLE UNDER UV LIGHT ON SECURITY DOCUMENTS AND VALUABLE ARTICLES

(75) Inventors: Roger D. Hersch, Epalinges (CH); Philipp Donzé, Zurich (CH); Sylvain Chosson, Ecublens (CH)

(73) Assignee: Ecole Polytechnique Federale de Lausanne (EPPL), Lausanne (CH)

( * ) Notice: Subject to any disclaimer, the term of this patent is extended or adjusted under 35 U.S.C. 154(b) by 1282 days.

(21) Appl. No.: 11/785,931

(22) Filed: Apr. 23, 2007

(65) Prior Publication Data

US 2008/0259400 A1 Oct. 23, 2008

(51) Int. Cl.
*H04N 1/405* (2006.01)
*H04N 1/40* (2006.01)
*G06K 15/00* (2006.01)

(52) U.S. Cl. ........ 358/3.09; 358/3.06; 358/3.2; 358/3.1; 358/2.1

(58) Field of Classification Search ........................ None
See application file for complete search history.

(56) References Cited

U.S. PATENT DOCUMENTS 5,309,246 A * 5/1994 Barry et al. .................... 358/1.9
6,185,004 B1 * 2/2001 Lin et al. ........................ 358/1.9
6,429,951 B1 * 8/2002 Kiuchi et al. .................. 358/1.9
6,494,490 B1 12/2002 Trantoul
7,005,166 B2 2/2006 Narita et al.
7,054,038 B1 5/2006 Ostromoukhov et al.
7,182,451 B2 2/2007 Auslander
7,379,205 B2 5/2008 Auslander et al.
7,422,158 B2 9/2008 Auslander et al.
7,536,553 B2 5/2009 Auslander et al.
2004/0233465 A1 * 11/2004 Coyle et al. .................... 358/1.9
2005/0243340 A1 * 11/2005 Tai et al. ........................ 358/1.9
2007/0006127 A1 * 1/2007 Kuntz et al. ................... 717/104
2007/0095235 A1 * 5/2007 Nielsen et al. ................ 101/483

OTHER PUBLICATIONS

U.S. Appl. No. 10/818,058, filed Apr. 4, 2003, Coyle, W. J. and Smith, J. C.
Bala, R., 2003, Device characterization, In Sharma, G., Digital Color Imaging Handbook, CRC Press, 2003, Section 5,10,3, pp. 357-360.
Balasubramanian, R., 1999, Optimization of the spectral Neugebauer model for printer characterization, J. of Electronic Imaging, vol. 8, No. 2, 156-166.
Chosson S., and Hersch R.D., 2002, Color Gamut Reduction Techniques for Printing with Custom Inks, Conf. Color Imaging: Device-Independent Color, Color Hardcopy, and Graphic Arts VII, SPIE vol. 4663, 110-120.
Emmel, P., 2003, Physical models for color predictions, In Sharma, G., Digital Color Imaging Handbook, CRC Press, 2003, Ch. 3, 173-238.

(Continued)

*Primary Examiner* — King Poon
*Assistant Examiner* — Ming Hon

(57) ABSTRACT

A new method of creating fluorescent color images visible under UV light is proposed, which relies on fluorescent colorants obtained by superposing fluorescent ink dots, on juxtaposed halftoning, and on mapping the gamut of the image to be reproduced into the gamut of the fluorescent colorants. The resulting color images are invisible under daylight and have, under UV light, a high resemblance with the original images. Applications comprises the protection of security documents and valuable articles, as well as publicity, fashion and night life, where fluorescent images viewed in the dark under UV illumination have a strongly appealing effect.

14 Claims, 17 Drawing Sheets

OTHER PUBLICATIONS

Hains, C., Wang, S.-G. and Knox, K., 2003, Digital color halftones, In Sharma, G., Digital Color Imaging Handbook, CRC Press, 2003, Ch. 6, 385-490.

MacDonald, L. W., Morovic, J., and Xiao, K., 2000, A topographic gamut mapping algorithm based on experimental observer data, In Proceedings of 8th IS&T/SID Color Imaging Conference, 311-317.

Moon, P., Spencer E., 1971, Field Theory Handbook, Springer-Verlag, 2nd edition, pp. 51-75.

Morovic, J., 2003, Gamut mapping, In Sharma, G.,Digital Color Imaging Handbook, CRC Press, 2003, Ch. 10, 639-685.

Nassau, K., 1983, The Physics and Chemistry of Color, John Wiley & Sons, New York City, NY, pp. 70 and 400-405.

Sharma, G., 2003b, Color fundamentals for digital imaging, In Sharma, G., Digital Color Imaging Handbook, CRC Press, 2003, Chap. 1, 15-40.

Van Renesse, R.L., Ed. 2005, Optical Document Security, Artech House, London, England, pp. 97-102.

Wyble, D.R., Berns, R.S, 2000, A Critical Review of Spectral Models Applied to Binary Color Printing, Journal of Color Research and Application vol. 25, No. 1, 4-19.

U.S. Appl. No. 10/338,583, filed Jul. 22, 2004, D. Kaz and K. Shibata.

U.S. Appl. No. 10/482,892, filed Oct. 21, 2004, Brehm L. Erbar H.

* cited by examiner $$a_n = \sqrt{1/3}$$

$$s_1' > \frac{1}{3}, s_2' < \frac{1}{3}, s_3' < \frac{1}{3}$$

$$s_{12}' = (s_1' - \frac{1}{3})\frac{1/3 - s_2'}{2/3 - s_2' - s_3'}$$

$$s_{13}' = (s_1' - \frac{1}{3})\frac{1/3 - s_3'}{2/3 - s_2' - s_3'}$$

$$w_2 = \sqrt{s_2'};\ w3 = \sqrt{s_3'}$$

$$s_{12}' = (w_2 + \sqrt{1/3}) \cdot h_{12}$$

$$s_{13}' = (w_3 + \sqrt{1/3}) \cdot h_{13}$$

$$s_{23}' = 0$$

$$a_n = \sqrt{1/3}$$

$$s_1' > \frac{1}{3},\ s_2' > \frac{1}{3},\ s_3' < \frac{1}{3}$$

$$s_{13}' = (s_1' - \frac{1}{3})$$

$$s_{23}' = (s_2' - \frac{1}{3})$$

$$w_3 = \sqrt{s_3'};$$

$$s_{13}' = (w_3 + \sqrt{1/3}) \cdot h_{13}$$

$$s_{23}' = (w_3 + \sqrt{1/3}) \cdot h_{23}$$

$$s_{12}' = 0$$

PRINTING COLOR IMAGES VISIBLE UNDER UV LIGHT ON SECURITY DOCUMENTS AND VALUABLE ARTICLES

BACKGROUND

The present invention relates to the field of anti-counterfeiting and authentication methods and devices and, more particularly, to methods, security devices and apparatuses for authenticating documents and valuable products by color fluorescent images invisible or barely visible under day light.

Since high-quality and low-priced color photocopiers and desk-top publishing systems are available, counterfeiting of documents is becoming now more than ever a serious problem. The same is also true for other valuable products such as CDs, DVDs, software packages, medical drugs, watches, etc., that are often marketed in easy to falsify packages.

The present invention provides a novel security element offering enhanced security for devices needing to be protected against counterfeits, such as banknotes, checks, credit cards, identity cards, travel documents, valuable business documents, and packages of goods such medical drugs.

A further application concerns valuable products where protective and decorative features can be combined. For example luxury goods such as watches and clocks, bottles of expensive liquids (perfumes, body care liquids, alcoholic drinks), clothes (e.g. dresses, skirts, blouses, jackets and pants), may exhibit striking fluorescent color images when viewed under UV light and at the same time prevent counterfeits by making the unauthorized reproduction of such fluorescent color images very difficult to achieve.

As a further application field, the present invention also enables creating digital fluorescent color images for commercial art, decoration, publicity displays, fashion articles, and night life, where fluorescent images viewed under UV illumination at night or in the dark have a strongly appealing effect.

Since a long time, fluorescent inks visible under UV light but invisible under normal day light are used for the authentication of security documents, such as passports, bank notes, checks and vouchers, see Van Renesse, R. L., 2005, Optical Document Security, Artech House, London, England, pp. 97-102. A single ink layer is used for printing either text or a bilevel image. Fluorescent inks are extensively used in the Euro bank notes, where both the stars and the silhouette of Europe are highlighted under UV light. However, since fluorescent inks are available on the market, their protection against counterfeits have decreased.

A recent challenge consists in trying to create color images by using several fluorescent inks each emitting in a different part of the visible wavelength range. U.S. Pat. No. 7,054,038, Method and apparatus for generating digital halftone images by multi color dithering, filed Jan. 4, 2000, to Ostromoukhov and Hersch (also inventor in the present patent application), teaches a multi-color dithering method where one or more inks are possibly fluorescent inks. However, they do not explicitly take into account the quenching effect and do not provide solutions for reducing the concentration of the ink by printing smaller ink dots.

Patent application Ser. No. 10/818,058, "Methods and ink compositions for invisibly printed security images having multiple authentication features", to Coyle, W. J. and Smith, J. C, filed Apr. 5, 2004, proposes to create fluorescent color images with red, green and blue emitting fluorescent inks, which are invisible under day light. They advocate to perform the color separation from classical cyan, magenta and yellow to red, green and blue fluorescent inks by converting the image colors to their negative form using commercially available computer software such as Adobe PhotoShop. That disclosure converts an image color to its negative form by starting with an input cyan (c), magenta (m) and yellow (y) image, and deducing the corresponding surface coverages of red (r), green (g) and blue (b) by simple negation, i.e. $r=1-c$, $g=1-m$, $b=1-y$. By replacing cyan, magenta and yellow cartridge inks with red, green and blue fluorescent ink cartridges and by printing the three ink layers in mutual registration, a color fluorescent image is obtained. That patent application proposes to use the halftoning of standard ink-jet printers, generally error-diffusion or blue noise dithering. These halftoning methods rely on the superposition of the ink layers and may therefore yield quenching effects reducing the fluorescent emission spectra. That patent application also does not teach how to expand the fluorescent color gamut by creating additional colorants through the superposition of fluorescent ink dots, possibly at a reduced dot size. In addition, since red, green and blue fluorescent inks are starting to become available on the market, and since converting an image to its negative by commercially available computer software is accessible to the public, the protection offered by this method may become limited.

U.S. Pat. No. 7,005,166 B2, Method for fluorescent image formation, print produced thereby and thermal transfer sheet thereof, to Narita and Eto (2002), teaches how to thermally transfer red, green and blue fluorescent dyes onto paper, thereby forming an image with color gradations. They neither propose an explicit halftoning method nor do they deal with the problem of reproducing an input color image.

SUMMARY

In the present invention, we propose a method and a, system of creating fluorescent color images visible under UV light which provide fluorescent color images of high intensity by minimizing quenching effects. Quenching effects occur when the concentration of the fluorescent substance is too high. Quenching occurs typically when superposing fluorescent inks on top of one another. Quenching reduces the intensity of the fluorescent emission and therefore the resulting color gamut.

The method relies on the new colorants that can be achieved by superposing ink dots, possibly at a reduced size, in order to avoid quenching effects. It also relies on juxtaposed halftoning, which ensures that colorants are printed side by side and therefore do not overlap, thereby preventing quenching effects. It supports the selection of a set of fluorescent inks which comprises at least one ink whose emission spectrum yields a color different from the red, green and blue colors, for example a yellow color fluorescent ink. The method comprises the following techniques: (a) creating new colorants by superposing carefully selected amounts of the fluorescent inks, (b) mapping the gamut of the image to be reproduced into the gamut formed by the created fluorescent colorants and (c) creating the target fluorescent color image by juxtaposed halftoning of the fluorescent colorants.

The presently disclosed method and system avoid quenching by creating new colorants by superposing inks at reduced dot sizes, thereby reducing their apparent concentration. Quenching is also avoided by using the disclosed juxtaposed halftoning algorithm which avoids superposing fluorescent colorants, i.e. which, in contrast to most classical halftoning methods, does not overlap screen dots, and which ensures that the black of the support (e.g. paper) is laid out between the colorant screen dots. This prevents screen dot overlaps even in case of dot gain or misregistration between the ink layers.

Depending on the printing technology, reducing the dot size may consist in reducing the pixel dot size (ink-jet printer) or may consist of reducing the halftone dot size (electrophotography, offset printing).

The proposed gamut mapping method for mapping a full color gamut into the reduced color gamut offered by the fluorescent colorants has the particularity of being able to project out-of-gamut colors whose hues are not within the fluorescent ink gamut into nearby desaturated in-gamut colors or into achromatic colors located along or close to the black-white axis (e.g. the L* axis in the CIELAB color space).

Juxtaposed halftoning comprises the steps of (i) computing how much surfaces of individual colorants spread out into neighboring cells, (ii) creating colorant surface layouts according to ratios of their surface coverages, (iii) rasterizing the colorant surface layouts into juxtaposed colorant screen elements and inserting them according to their surface coverages into corresponding juxtaposed screen element library entries. Colorant surface layouts are computed by calculating how much each colorant spreads out into neighboring colorant cells. During the creation of the halftoned fluorescent color image, colorant surface coverages allow accessing a corresponding juxtaposed screen element library entry and retrieving the colorant to be printed at the current position.

Improved protection against counterfeiting is possible by selecting at least one fluorescent ink visible under UV light, which is different from red, green and blue fluorescent inks, i.e. a non-RGB fluorescent ink. In order to visually verify the presence of such a non-RGB fluorescent ink, the output image screen associated with the fluorescent color output image comprises juxtaposed colorant screen dots having different frequencies, among them low frequency screen dots allowing one to verify the screen dot color with the naked eye. Juxtaposed screen dots having different frequencies may be obtained by a two-dimensional geometric transformation between the output image screen and the original juxtaposed screen. Such a geometric transformation may be embodied by a conformal mapping. It yields a variable sized juxtaposed screen comprising screen elements of smoothly increasing sizes.

A high frequency juxtaposed screen provides an increased protection against counterfeits, since a high registration printer is necessary in order to create the colorant dots by superposition of variable size ink dots. In case of bad registration accuracy, correspondingly sized ink dots may not overlap and therefore induce fluctuations in quenching. Such fluctuations in quenching will appear as undesired variations in fluorescent intensity and/or color. On the other hand, in applications where counterfeit protection is not an issue, middle or low frequency juxtaposed screens allows for some misregistration to occur, since colorant dots formed by the ink dots are surrounded by the black space of the support.

In a preferred embodiment, a system for creating fluorescent output image visible under UV light comprises a juxtaposed halftoning module which (i) deduces, at each current pixel of the fluorescent output image, a corresponding input image location and its source image color, (ii) obtains colorant surface coverages of contributing colorants for reproducing that source image color by accessing a table mapping input calorimetric values to these colorant surface coverages, (iii) accesses a juxtaposed screen element at a juxtaposed screen element library entry corresponding to these colorant surface coverages, reads the colorant of the current pixel and copies it into the current fluorescent output image pixel and (iv) deduces from the fluorescent output image the information that is to be sent to the printer. Depending on the type of the target printer, this information comprises either ink pixel dot size information or ink layer pixel on/off information.

Such a system may also comprise as printing system initialization software module a fluorescent gamut creation and mapping module carrying out the operations of (i) creating a tetrahedrized color gamut, (ii) associating to each tetrahedron vertex, possibly thanks to a fluorescent color prediction model, color gamut colors to colorant surface coverages, (iii) mapping input colors into the fluorescent colorant gamut, and (iv) creating the table mapping input colorimetric values to colorant surface coverages in a device-independent colorimetric space.

The system may also comprise as initialization software module a juxtaposed halftoning initialization module creating the juxtaposed screen library mapping colorant surface coverages to juxtaposed colorant screen elements, where in order to avoid overlapping between colorant dots, unprinted black is distributed around the colorant dots, by (i) creating modified colorant surface coverages each incorporating a fraction of the unprinted black surface, (ii) spreading out colorants having a modified surface larger than an initially allocated halftone dot cell space onto the neighboring colorants requiring less than the initially allocated cell space, (iii) scaling down the surface of each colorant so as to recreate the initially specified unprinted surface coverage surrounding the colorant surfaces, and (iv) rasterizing the colorant surfaces and storing them at entries of the juxtaposed screen element library corresponding to their respective surface coverages.

Thanks to gamut mapping and juxtaposed halftoning, we create color images, which are invisible under daylight and have, under UV light, a high resemblance with the original images. Applications comprises the protection of security documents such as bank notes, passports, ID cards, entry tickets, travel documents, checks, vouchers or valuable business documents. It also comprises the protection and/or decoration of valuable articles such as CDs, DVDs, software packages, medical drugs, watches, personal care articles, and fashion articles. Further applications comprise commercial digital art, decoration, publicity, fashion, and night life, where fluorescent images viewed under UV illumination at night or in the dark have a strongly appealing effect.

DESCRIPTION OF THE INVENTION

Figure 1A:
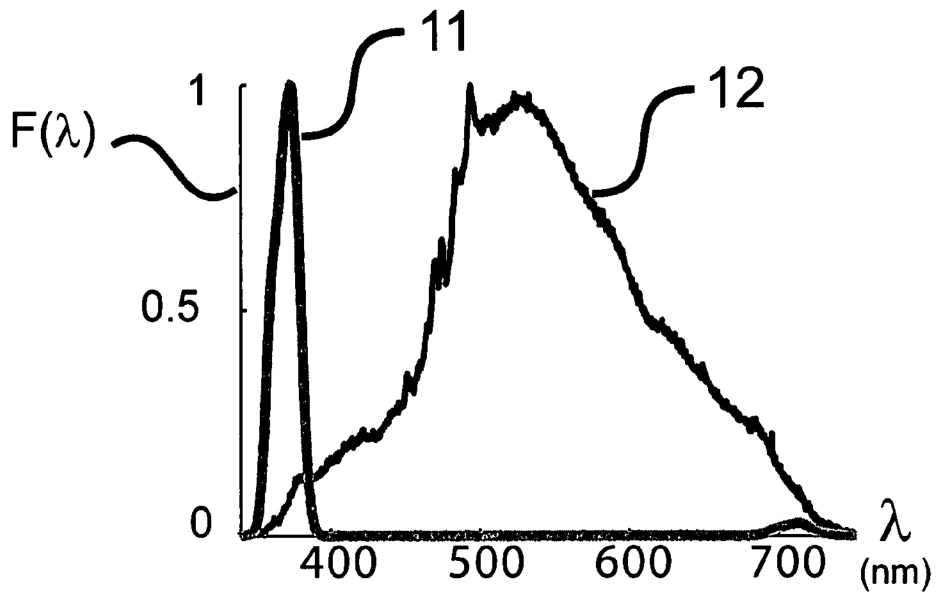
FIG. 1A shows the relative emission spectrum 12 of the LINOS LQX-1000 light source and the resulting filtered UV light spectrum 11.

Creating with non-standard fluorescent inks color images visible only under UV light raises a number of challenges. These challenges comprise (1) understanding the role of the support (e.g. paper), (2) creating new colorants from a given set of fluorescent inks, (3) creating all colors within a color gamut by color halftoning, (4) establishing a color space for fluorescent emission spectra and performing gamut mapping from original image colors to the fluorescent inks' target gamut, and (5) converting the mapped original colors to surface coverages of the fluorescent inks. Let us first describe these challenges in more depth, by formulating the questions whose answers are part of the present invention. Let us also introduce the terminology and give a brief description of the fluorescence phenomenon. In the following description, we often refer to chapters of the book: Digital Color Imaging Handbook, Ed. G. Sharma, CRC Press, 2003, referred to as [Sharma 2003a].

The Role of the Support (Paper or Any Other Substrate).

Classical color separation and printing techniques rely on the fact that inks are printed on top of white paper. The white paper acts both as a colorant of its own (white) and as a reflector of the incoming light traversing a printed ink layer. Printing with fluorescent inks is completely different: the inks absorb energy in the UV wavelength range and reemit part of the energy in the visible wavelength range. Paper or any other reflective or transmittive substrate acts as support for depositing the fluorescent ink. Under UV illumination, non-printed support areas are black. There is no paper white. The paper white needs to be replaced with a white colorant.

Creating New Colorants from the Available Inks.

In classical printing technologies, the superposition of solid cyan, magenta and yellow inks yields the new colorants red, green, blue and black. To which extend is it possible to create new colorants, i.e. colorants which enlarge the resulting fluorescent color gamut by superposing two or more fluorescent inks?

Halftoning with Fluorescent Inks.

In classical clustered-dot color halftoning methods (e.g. the ones used for offset printing), the ink layers are halftoned independently of each other. Hence, the printed ink dots partially overlap. Can we allow the fluorescent inks to partially overlap? Is the resulting emission spectrum the sum of the emission spectra of each of the superposed inks? Or does the emission spectrum of one fluorescent ink block the emission spectrum of the other fluorescent ink? In such a case, what halftoning method shall we adopt in order to avoid undesired superpositions of two fluorescent inks? How do we account for dot gain?

Color Space for Mapping Original Image Colors to Colors Reproducible by Fluorescent Inks.

In order to produce printed images visible under UV light which have a good resemblance with original color images, it is necessary to establish a common device-independent color space, e.g. the CIELAB space, see Sharma, G., Color fundamentals for digital imaging, Section 1.7 Uniform color spaces and color differences, pp. 28-40, in [Sharma 2003a], herein incorporated by reference, referenced as [Sharma 2003b]. By performing gamut mapping in that color space, original colors shall be mapped into reproducible colors by introducing as less hue distortions as possible. How do we specify the CIE-XYZ space for the emission spectra of fluorescent inks? And, in order to convert from CIE-XYZ to CIELAB, how shall we choose the reference "white stimulus"?

Converting Mapped Original Colors into Surface Coverages of the Fluorescent Colorants.

In classical color printing, mapping of original colors to cyan, magenta, yellow and black ink surface coverages is often performed by a look-up table. Such an approach requires printing hundreds of patches, measuring them and deriving by interpolation the entries of the look-up table, see Bala, R., Device characterization, in [Sharma 2003a], Section 5.10.3, pp 357-360, hereinafter referenced as [Bala 2003]. An alternative approach consists in establishing and calibrating a color prediction model which predicts the color produced with given surface coverages of the set of available colorants, see Balasubramanian, R. Optimization of the spectral Neugebauer model for printer characterization, J. of Electronic Imaging, Vol. 8, No. 2, 1999, 156-166, hereinafter referenced as [Balasubramanian 1999]. From the model, one may also deduce the surface coverages of the colorants so as to produce a desired calorimetric value. This is the approach that we pursue in the present disclosure, in the context of colors created by light emitted from fluorescent colorants.

Terminology.

The disclosed methods and systems for creating fluorescent color image visible only under UV light work on any reflective or transmittive substrate, such as paper, plastic, transparency, glass, metal, etc. In respect to the presently disclosed fluorescent color imaging methods, the term paper is used only as an example of a support and may be replaced by any kind of support. The term "support black" or "unprinted black" specifies the unprinted area of the support, which appears as black under UV light.

A "color" is defined by its colorimetric values (e.g. intensity of red, green and blue in an RGB system) or by its tri-stimulus values (e.g. values of X, Y and Z in the CIE-XYZ colorimetric system).

A "fluorescent emission color prediction model" enables predicting the color produced by a set of fluorescent colorants of known surface coverages. Inversely, given a desired color, a fluorescent emission color prediction model may yield the colorant surface coverages producing that desired color, for example by an optimization procedure minimizing the sum of square differences between the desired calorimetric values and the predicted calorimetric values (in the Matlab software package: functions "fminsearch" or "fmincon").

A "fluorescent emission spectral prediction model" enables predicting the spectra produced by a set of fluorescent colorants of known surface coverages. Since emission spectra can be converted into colors, a fluorescent emission spectral prediction model can also act as a fluorescent emission color prediction model. Therefore, for a color of given colorimetric values, the fluorescent emission spectral prediction model may yield the colorant surface coverages producing that desired color.

Figure 17A:
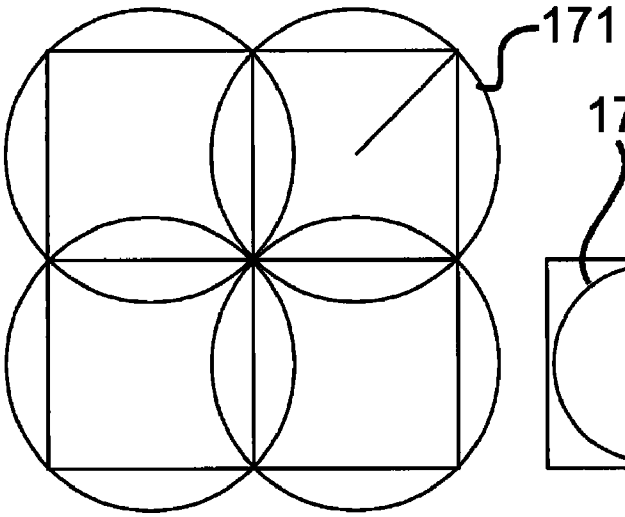
FIG. 17A shows examples of full size ink pixel dots 171, FIG. 17B an example of an ink pixel dot 172 reduced to ⅔ and FIG. 17C an example of ink pixel dot 173 reduced to ⅓ of its full size.
Figure 17B:
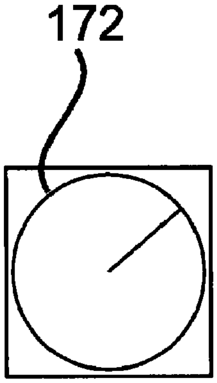
FIG. 17D shows an example of a non-reduced ink halftone dot 174, FIG. 17E an example of a ink halftone dot 175 reduced to ⅔ and FIG. 17F an example of an ink halftone dot 176 reduced to ⅓ of its full size.
FIG. 17G shows an example of a new colorant made of a superposition of a full size pixel dot of ink $c_1$ (171) a pixel dot size reduced to ⅔ of ink $c_2$ (172) and a pixel dot size reduced to ⅓ of ink $c_3$ (173)
FIG. 17H shows an example of a new colorant made of a superposition of a non-reduced ink halftone dot of ink $c_1$ (174) an ink halftone dot reduced to ⅔ of ink $c_2$ (175) and an ink halftone dot reduced to ⅓ of ink $c_3$ (176)
Figure 17C:
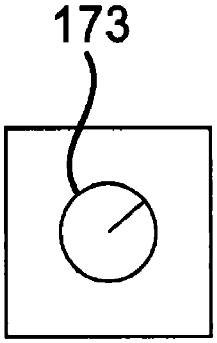

Modern digital printers have the possibility of modifying the size of the individual printed pixel, for example by supporting a full dot size pixel (FIG. 17A), a middle dot size pixel (FIG. 17B) and a small dot size pixel (FIG. 17C). This feature is called "pixel dot size modulation" and pixel dot sizes smaller than the full pixel dot size are called "reduced pixel dot sizes". A "colorant pixel dot" may be formed by the superposition of full dot size, middle dot size or small dot size pixels.

In classical mutually rotated clustered-dot screens, the ink layers are printed independently of each other and the colorants surface coverages depend on the ink surface coverages according to the Demichel equations, see Wyble, D. R., Berns, R. S., A Critical Review of Spectral Models Applied to Binary Color Printing. Journal of Color Research and Application Vol. 25, No. 1, 2000, pp. 4-19, hereinafter referenced as [Wyble and Berns 2000]. In the present invention, in order to avoid quenching effects, juxtaposed halftoning is used. In juxtaposed halftoning, instead of the inks, the colorants are the base elements and they are printed side by side. The term "colorant surface coverage" indicates the percentage of surface that a colorant covers when printed on its support.

In the present disclosure, the terms "juxtaposed colorant dot screen" or simply "colorant dot screen" designate the halftone layer produced by juxtaposed halftoning. The corresponding terms "juxtaposed colorant dot" or simply "colorant dot" designate the halftone dot obtained by juxtaposed halftoning.

Figure 17D:
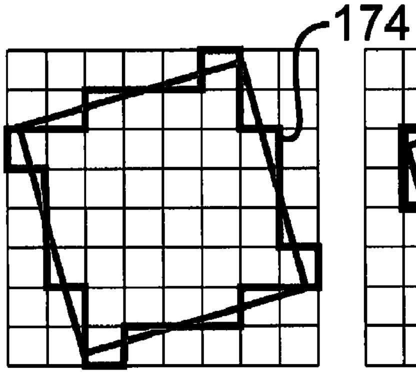
Figure 17E:
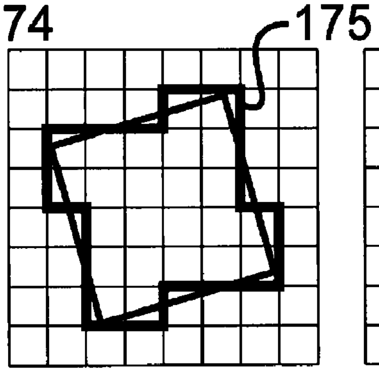
Figure 17F:
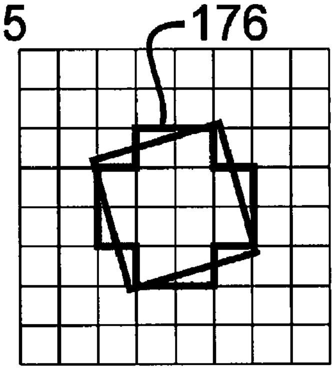
Figure 17G:
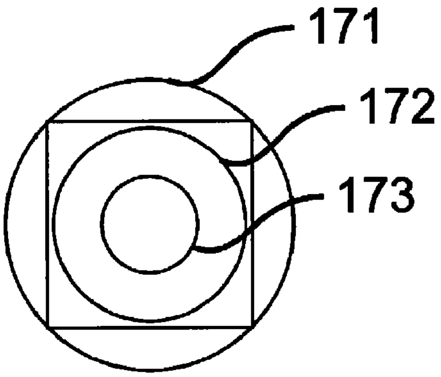
Figure 17H:
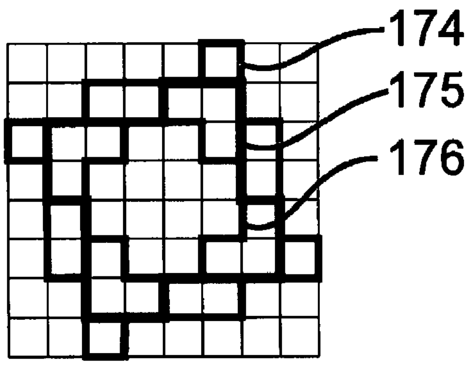

In classical clustered-dot printing, the ink halftone dot size depends only on the surface coverages of the inks. In the present disclosure, we create new "colorants" by superposing two or more ink dots. A "colorant halftone dot" may be formed by the superposition of full size ink halftone dots (FIG. 17D) or in order to reduce the apparent concentration of fluorescent inks, of a superposition comprising reduced size ink halftone dots. A reduced size ink halftone dot is a full size ink halftone dot scaled down by a certain factor, e.g. multiplied by ⅔ to obtain a middle size ink halftone dot (FIG. 17E) or multiplied by ⅓ to obtain a small size ink halftone dot (FIG. 17F). A colorant halftone dot of a given colorant surface coverage is therefore created by superposing corresponding ink halftone dots according to the given colorant surface coverage, possibly scaled down in the case that the colorant is specified as a superposition with reduced size ink halftone dot(s), see e.g. FIG. 17F. The terms "colorant halftone dot" and "colorant screen dot" are used interchangeably. The term "colorant screen element" indicates the screen element where the colorant screen dot is placed.

Fluorescence.

The fluorescence phenomenon is due to the transition of molecules from an excited state to a ground state. We consider molecules having two energy states, $E_0$ for the ground state and $E_1$ for the excited state, see Nassau, K., The Physics and Chemistry of Color, John Wiley & Sons, New York City, N.Y., 1983, pp. 70 and 400-405, hereinafter referenced as [Nassau 1983]. When a molecule absorbs incident light, it is moved to one of the vibrational levels of the excited state $E_1$, see FIG. 3.19*a* in Emmel, P. 2003, Physical models for color predictions, in [Sharma 2003a], Chap. 3, 173-238, incorporated by reference, hereinafter referenced as [Emmel 2003]. The different vibrational states of an energy state correspond to the different vibrations between atoms within the molecule. Thanks to a non-radiative process, such as collisions leading to a small rise in temperature, a molecule at one of the high vibrational level of energy state $E_1$ falls back into the lowest vibrational level of energy state $E_1$, see FIG. 3.19*b* in [Emmel 2003]. Then, in order to further release the absorbed energy and fall back into energetic ground state $E_0$, fluorescence occurs from the lowest vibrational level of energy state $E_1$ to the excited levels of the ground state, see FIG. 3.19*c* in [Emmel 2003]. The molecule then returns to its lowest level of ground state $E_0$ by non-radiative transitions.

We consider here fluorescent molecules which absorb in the ultra-violet light wavelength range (mainly 320 nm-380 nm, but possibly also at shorter wavelengths) and reemit light in part of the visible wavelength range (380 nm-730 nm). The spectrum of light emitted by fluorescence corresponds to the different changes of energy levels, from the lowest vibrational level of excited state $E_1$ to the excited vibrational levels of $E_0$. The shape of the spectrum emitted by fluorescence does not depend on the spectrum of the absorbed light. Nevertheless, when the UV light source matches the absorption spectrum, the emitted spectrum has its highest relative intensity. At low concentrations of fluorescent molecules, the fluorescence phenomenon is approximately linear. In contrast, at high concentrations, the behavior of the fluorescent substance is no longer linear: the absorption is too large, and temperature, dissolved oxygen and impurities reduce the quantum yield, i.e. the ratio between reemitted photons and absorbed photons. This non-linear phenomenon is known as quenching [Nassau 1983].

Let us first describe the measurement equipment setup used for measuring the emission spectra of fluorescent inks. We then show the emission spectra of individual fluorescent inks, the emission spectra of superposed inks and the emission spectra of juxtaposed fluorescent inks. We then show how to select a set of colorants extending the fluorescent color gamut. We establish a spectral emission prediction model for predicting the emission spectra of patches printed with fluorescent inks. Afterwards, we define a device independent color space for fluorescent inks. Fluorescent emission spectra are converted to device independent colors. In this color space, we describe a gamut mapping algorithm for mapping a display gamut (e.g. the standard sRGB display gamut) into the reduced color gamut formed by the set of fluorescent colorants. We then describe how to deduce from input colors the corresponding fluorescent colorant surface coverages and how to halftone these colorants in order to print target images visible only under UV light.

Measurement Equipment, Paper and Printer.

Figure 1B:
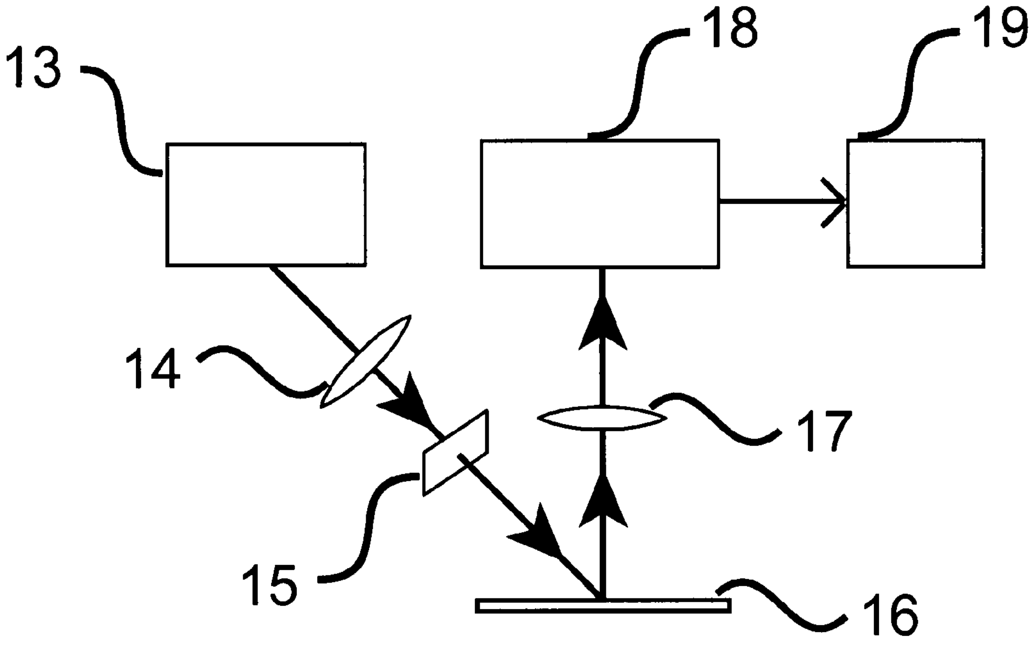
FIG. 1B shows the optical setup for measuring the emission spectra of patches printed with fluorescent inks.
Figure 11:
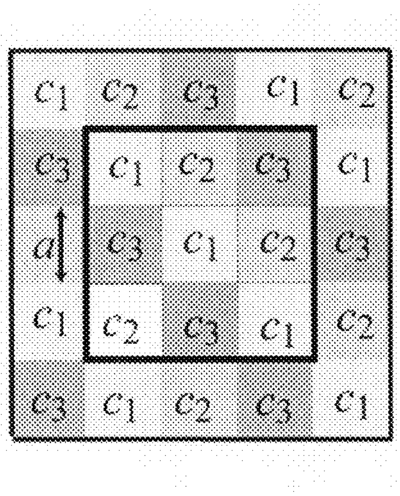
FIG. 11 shows a 3×3 juxtaposed cell array, tiling the plane by horizontal and vertical replication, with the colorant cells having here a diagonal orientation of −45°.

Standard desktop spectrophotometers only emit light in the visible wavelength range and are therefore not appropriate for measuring the emission spectrum of fluorescent materials. Therefore, we created our own spectral measuring equipment (FIG. 1B) by illuminating the print sample with collimated light from a Xenon light source 13 filtered by a UV transmission filter 15. This yields a UV light emitting in the range between 350 nm and 400 nm with a peak around 365 nm (FIG. 1A, 11). The light source is connected to an optical fiber transmitting the light to a collimating optics 14, from which the beam exits into the air and is filtered by the UV transmission filter 15, before reaching the printed paper 16 at an angle of 45 degrees. The reflected, respectively the reemitted light is captured at 0 degree, i.e. perpendicularly to the print, traverses a focusing optics 17 and is guided by an optical fiber into a monochromator 18 (e.g. Oriel MS125 monochromator). The monochromator decomposes the incoming light into spectral components that are captured by photo-diodes which convert light component intensities to electronic signals transmitted to a computer 19. Since the intensity of the light source slightly varies over time and since the sensibility of the sensor also depends on the operating temperature, it is necessary to calibrate the measurement setup before carry out any spectral reflection measurements. When performing measurements in the visible wavelength light range, a perfectly white diffusing substrate such as Barium Sulfate ($BaSO_4$) is used as the reference white. However, in our case, the reemitted maximal fluorescence spectrum intensity is two orders of magnitudes lower than white light intensity. Calibrating our measurements with the reference white would yield reflectance factors lower than 1%. To obtain an acceptable dynamic range, we use as calibration patch a piece of dark gray paper which has a uniform reflectance spectrum.

Most "white" papers comprise fluorescent brighteners which emit light in the blue wavelength range. The strong blue-white light emitted by fluorescent paper tends to cancel the impact of the fluorescent ink emission. Therefore, in order to avoid interferences of paper brighteners, we preferably print the fluorescent inks on non-brightened papers, such as the APCO paper produced by Papierfabrik Scheufelen GmbH+Co. KG, Lenningen, Germany.

In the present disclosure, we describe an embodiment of the method by printing with fluorescent inks on an ink-jet printer. However, other embodiments are possible, such as printing with offset, printing by electrophotography, printing with a thermal transfer device or printing by dye sublimation. For the ink-jet printer embodiment, we selected the blue, red and yellow fluorescent inks that were available from a commercial company. The printer was a Canon PIXMA iP4000 ink-jet printer working at an effective resolution of 600×600 dpi, offering 4 intensity levels per pixel, i.e. no dot, a small size pixel dot (1 droplet), a middle size pixel dot (2 droplets) and a full size pixel dot (3 droplets).

Emission Spectra of Fluorescent Colorants.

Figure 2:
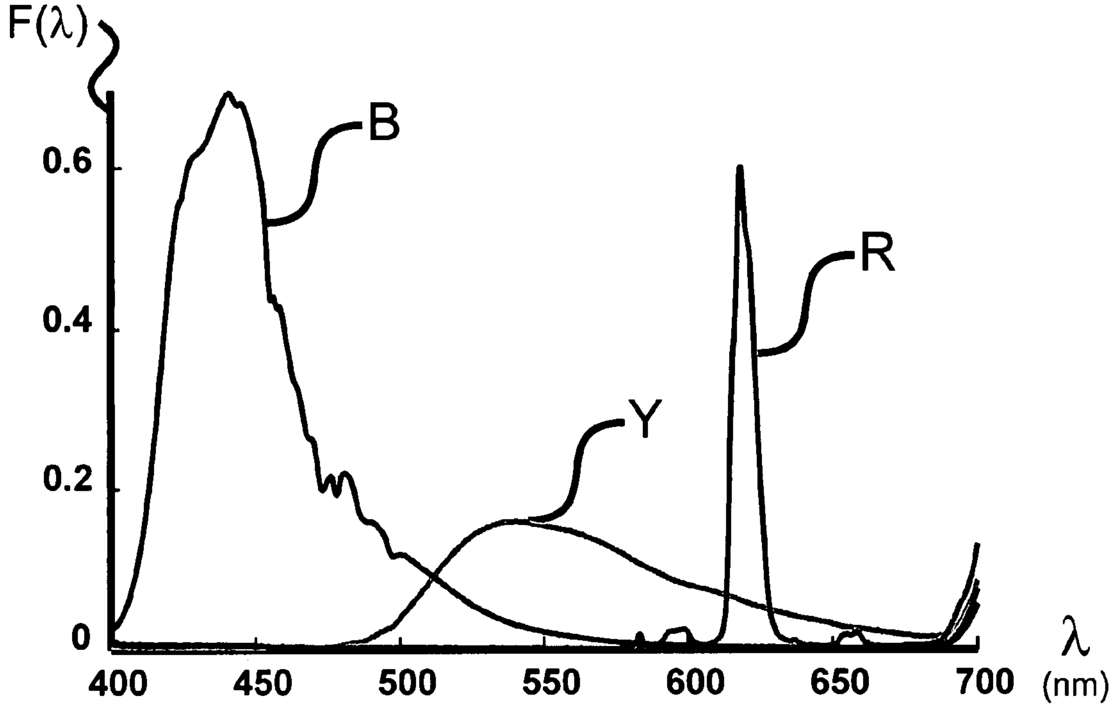
FIG. 2 shows the emission spectra of the blue (B), red (R), and yellow (Y) fluorescent inks.

We first explored which colors visible under UV light can be achieved by printing with the available set of fluorescent inks and tested the possibility of establishing a spectral emission prediction model predicting the emitted spectra as a function of the surface coverages of the individual inks. We are especially interested in the emission spectra obtained by superposing two, respectively three inks, and by juxtaposing (i.e. printing side by side) two, or respectively three inks. We first measured the emission spectra of each of the three blue (B), red (R) and yellow (Y) fluorescent inks printed on paper without optical brightener (FIG. 2).

The fluorescent inks absorb light in the UV wavelength range and reemit part of the light in the visible wavelength range. Therefore, in respect to the visible wavelength range, the process is an additive process where colored light is emitted, rather than a subtractive process, where incident light is absorbed. In analogy with a color display, one may think of placing red, green and blue fluorescent inks side by side. However such a solution is far from optimal, since a large part of the potentially achievable gamut is lost. For example, 100% red, printed at only ⅓ of the print surface (red printed, green not printed, blue not printed) offers a much smaller color gamut than 100% red printed on the whole surface. In addition, as shown by the emission spectra of FIG. 2, in the present case, we have a yellow ink (Y) instead of a green ink.

Figure 3:
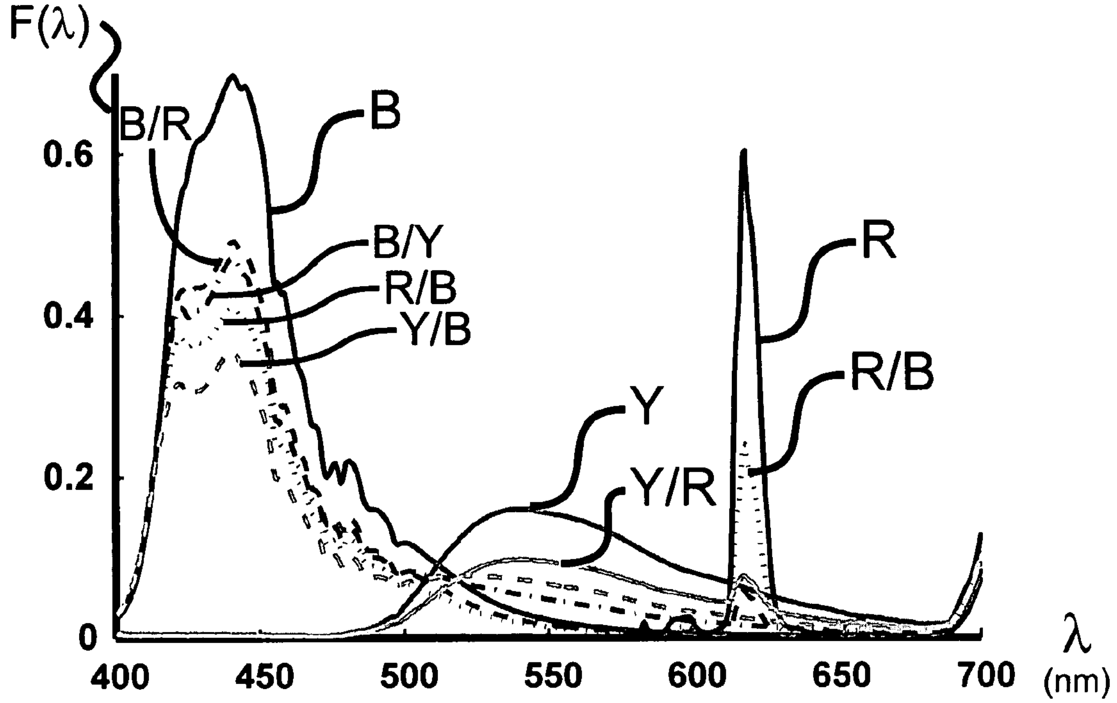
FIG. 3 shows the emission spectra of the inks and of their full dot size solid superpositions, respectively blue (B), red (R), yellow (Y), blue over red (B/R), blue over yellow (B/Y), red over blue (RIB), yellow over blue (Y/B), yellow over red (Y/R) and red over blue (R/B)

FIG. 3 shows the emission spectra of all the inks printed at their full pixel size as well as the corresponding full dot size solid superpositions, i.e. blue (B), red (R), yellow (Y), blue over read (B/R), blue over yellow (B/Y), red over blue (R/B), yellow over blue (Y/B), yellow over red (Y/R) and red over blue (R/B). In the present example, the blue fluorescent ink dominates and strongly reduces the appearance to the second ink. For example, the superposition of blue and yellow considerably reduces the intensity of the yellow emission spectrum.

The predominance of the blue ink in superposition with the other inks is due to the quenching effect, i.e. the blue ink has a high concentration of blue fluorescent molecules. Adding further potentially fluorescent molecules of the second ink creates a too high concentration limiting the fluorescence of the second ink's molecules and also, to a certain extend, reducing the fluorescence of the blue ink.

Modern ink-jet printers are able to print pixels at different droplet sizes. By printing at reduced dot sizes, e.g. at middle and small pixel dot sizes, we reduce the amount of the fluorescent substance, i.e. we reduce its apparent concentration. With reduced dot sizes, it is possible to superpose two or three inks without inducing strong quenching effects. In offset printing, the apparent concentration of a deposited ink halftone dot can be reduced by printing an ink halftone dot at for example ⅔ (middle dot size), or at ⅓ (small dot size) of its full halftone dot size.

Since there is no "paper white", our aim is to achieve by superposition of the selected set of inks a white colorant, i.e. a colorant which has a high lightness and which is as achromatic as possible. The superposition experiments also enable us to judge if additional colorants can be obtained which enlarge the fluorescent color gamut. Superposition experiments consist in printing all combinations of the selected set of inks, in the present example, the blue, red and yellow inks, in all superposition combinations comprising the full dot size and reduced dot sizes such as the middle dot size and the small dot size. In our example, for three superposed inks, this yields 27 different candidate colorants (free choice of 1 among 3 dot sizes for each ink). For two superposed inks, this yields 27 additional candidate colorants (choose 2 inks from 3 inks and for each ink, chose among 3 dot sizes). The candidate colorants are printed and their emission spectra are measured. The colorant with the emission spectrum yielding both high and substantially achromatic colorimetric values (i.e. similar amounts of X, Y and Z in CIE-XYZ) is selected as white colorant. Additional colorants are selected as further colorants, if their presence substantially extends the gamut defined by the inks, the white colorant and the black of the support (e.g. paper black). For example, a substantial extension consists in having the CIELAB coordinates of the considered colorant extending the gamut towards more chroma by at least a chroma difference of $\Delta C^*=+5$, where the chroma $C^*$ of a color in CIELAB is defined as $C^*=\sqrt{(a^*)^2+(b^*)^2}$ with $a^*$ and $b^*$ representing the chromatic coordinates [Sharma 2003b].

Figure 4:
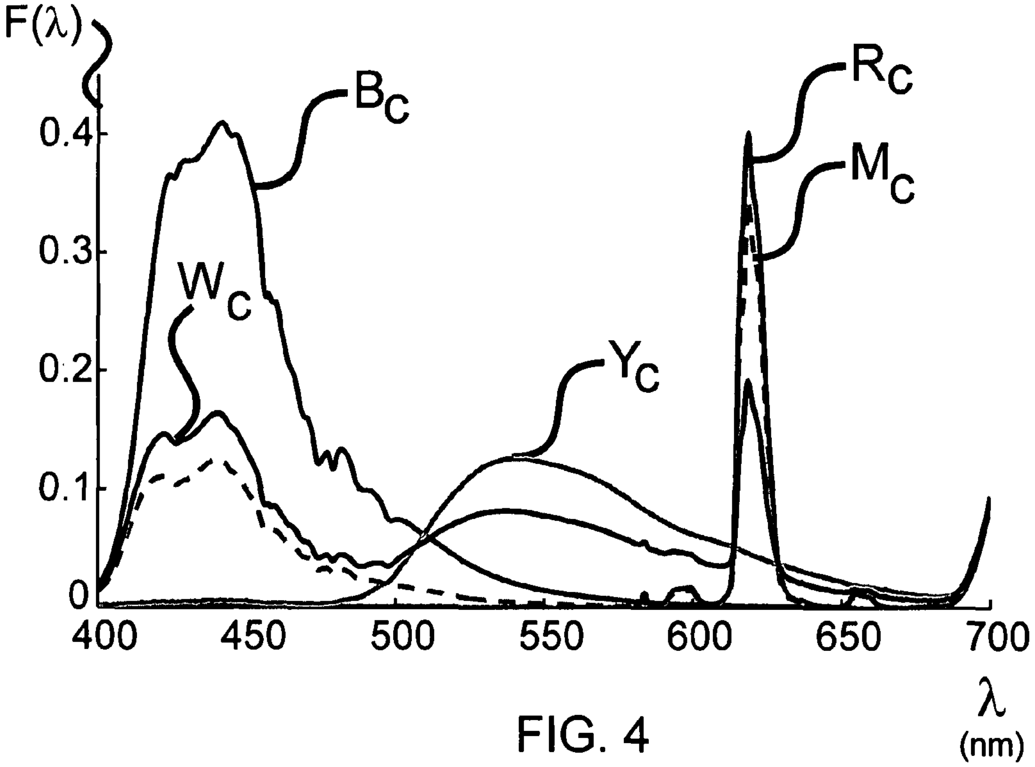
FIG. 4 shows the fluorescent emission spectra of the blue ($B_c$), red ($R_c$), yellow ($Y_c$), magenta ($M_c$) and white colorants ($W_c$)
Figure 7:
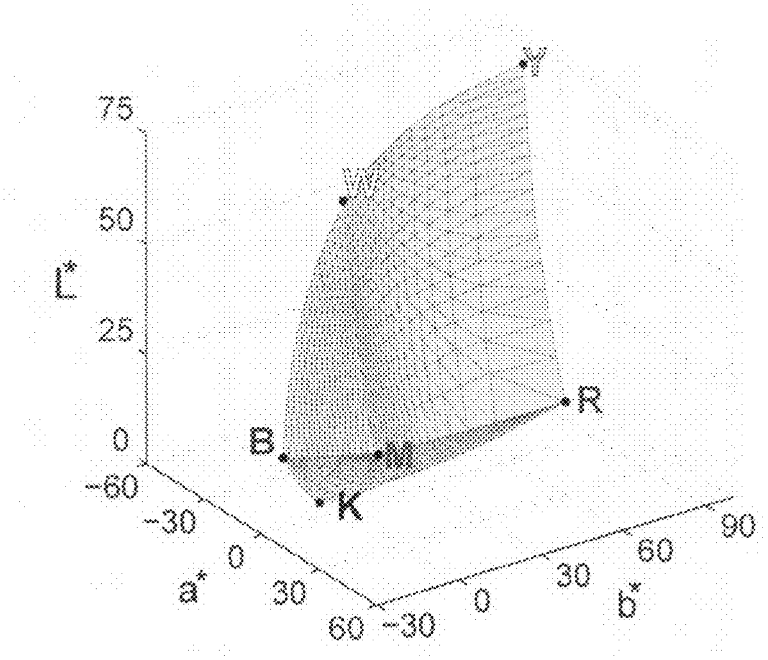
FIG. 7 shows the gamut of the fluorescent inks in CIELAB space, represented by 12288 adjacent tetrahedra.

In our example of selected set of inks, we reduce the apparent concentration of the blue fluorescent ink by using a medium dot size when blue is printed alone and a small dot size when blue is superposed with another ink. Reducing the apparent concentration of the blue ink by printing blue at a small dot size allow us to create the new colorant "white". In addition, from all the tested superpositions, a new colorant "magenta" is selected which substantially extends the fluorescent color gamut (FIG. 7). In the present example, the resulting set of colorants comprises blue ($B_c$: medium dot blue ink), red ($R_c$: medium dot red ink), yellow ($Y_c$: medium dot yellow ink), magenta ($M_c$: small dot blue ink and large dot red ink), and white ($W_c$: small dot blue ink, medium dot red ink, and large dot yellow ink). The corresponding fluorescent emission spectra are shown in FIG. 4.

In order to create color variations allowing to cover the color gamut given by the colorimetric values of the colorants and of the unprinted black of the support, we need to apply halftoning techniques. However, in order to avoid quenching effects, the fluorescent colorants should only be juxtaposed (printed side by side) and not superposed. Furthermore, in order to prevent undesired overlaps of colorants at the frontier between neighboring colorant dots due to dot gain or to misregistration between the ink layers, the unprinted black space should be distributed between the fluorescent juxtaposed colorant dots. The corresponding juxtaposed halftoning algorithm is described in the section "Juxtaposed halftoning".

Fluorescent Emission Color Prediction Model for Fluorescent Inks.

We need to create a relationship between the surface coverages of juxtaposed fluorescent colorants and the color of the corresponding halftone when seen under UV light. In order to avoid measuring the emission spectra of hundreds of patches, we prefer to build a fluorescent emission spectral prediction model predicting the emission spectra as a function of the relative surface coverages of the contributing juxtaposed fluorescent colorants.

For juxtaposed fluorescent colorants, the simplest spectral prediction model is an adaptation of the spectral Neugebauer model see [Wyble and Berns 2000]. The spectral Neugebauer model, adapted in the framework of the present invention to fluorescent juxtaposed colorant halftones, predicts the fluorescent emission spectrum of a juxtaposition of m colorants of fluorescent emission spectra $F_1, F_2, \ldots F_m$ of respective surface coverages $u_1, u_2, \ldots u_m$ by $$F(\lambda) = \sum_{i=1}^{m} u_i \cdot F_i(\lambda) \tag{1}$$

where one of the colorants is the unprinted black of the support.

It is known that the spectral Neugebauer model neither takes into account lateral propagation of light within the paper, nor internal Fresnel reflections at the print-air interface. Therefore, in the case of normal prints, it does not provide accurate predictions. Yule and Nielsen introduced a correction to the Neugebauer model in the form of a power function which, was applied by Viggiano to the spectral Neugebauer equations see [Wyble and Berns 2000]. By adapting the Yule-Nielsen corrected Neugebauer model to fluorescent colorant halftones, the emission spectrum of a fluorescent juxtaposed colorant halftone becomes $$F(\lambda) = \left(\sum_{i=1}^{m} u_i \cdot F_i^{1/n}(\lambda)\right)^n \tag{2}$$

where the scalar exponent n is fitted so as to minimize the sum of square differences between predicted and measured emission spectra components.

Figure 5:
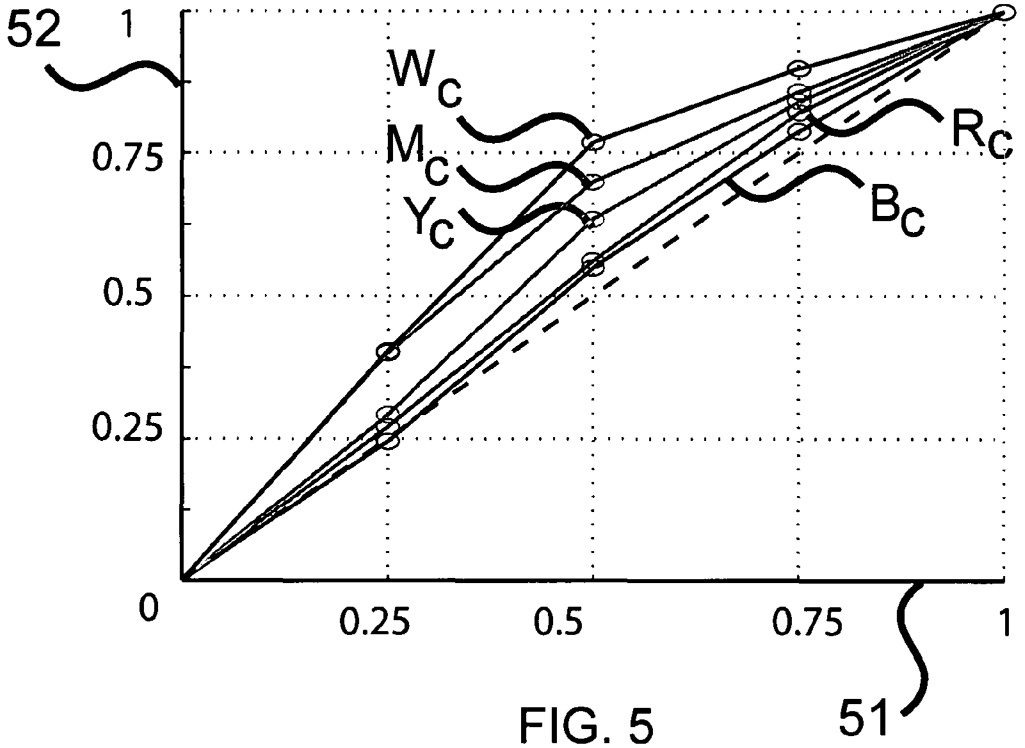
FIG. 5 shows the nominal to effective surface coverage curves for the base fluorescent colorants blue ($B_c$), yellow ($Y_c$) and red ($R_c$), and for the combined fluorescent colorants magenta ($M_c$) and white ($W_c$), with the effective surface coverages being fitted by applying the adapted spectral Neugebauer model.

The surface coverages $u_i$ that have to be used both in the case of the Neugebauer inspired model (Eq. (1)) and in the case of the Yule-Nielsen inspired model (Eq. (2)) should be the effective surface coverages, i.e. the surface coverages incorporating the dot gain [Balasubramanian 1999]. For both models, we create the curves mapping nominal to effective surface coverages by minimizing the sum of square differences between measured and predicted emission spectra components for nominal surface coverages values of 25%, 50% and 75% of each of the colorants (red, yellow, blue, magenta, white). Since the colorants are printed side by side and are as much as possible separated by unprinted space (black), we assume that the effective surface coverage of a colorant is independent of the surface coverage of the other colorants present in its neighborhood. FIG. 5 shows the nominal (horizontal axis 51) to effective (vertical axis 52) surface coverage curves. The derived colorants magenta ($M_c$) and white ($W_c$) comprising a combination of two or respectively three fluorescent inks have the largest dot gain.

We evaluate the accuracy of both the spectral Neugebauer and the Yule-Nielsen model adapted to fluorescent halftone colorants on 70 different representative fluorescent halftone test patches. Let us compare the calorimetric distances expressed in CIELAB $\Delta E_{94}$ between spectra predictions and spectra measurements for the two models. The CIELAB $\Delta E_{94}$ color difference metric is defined in [Sharma 2003b]. For the adapted spectral Neugebauer model, we achieve a mean prediction accuracy of $\Delta E_{94}=3.56$. For the adapted Yule-Nielsen modified spectral Neugebauer model, we achieve the same accuracy as with the adapted spectral Neugebauer model ($\Delta E_{94}=3.56$), with an optimal n-value n=0.92, a value close to 1. The adapted Yule-Nielsen model with a value of one is identical to the Neugebauer model and indicates that lateral propagation of light within the paper and multiple internal reflections (Fresnel reflections) at the boundaries between the paper surface and the air do not have a significant impact on the emitted spectra. This can be explained by the fact that emitted light propagating laterally is not absorbed by another ink. Indeed, since the presently used fluorescent inks are transparent in the visible wavelength range, they only emit light and do not absorb light. Therefore, once emitted from fluorescent ink molecules, light does not interfere with the light emitted from other fluorescent inks. As long as the individual inks are juxtaposed, we are in the presence of a purely additive phenomenon, which is well modeled by the spectral Neugebauer equations adapted to fluorescent colorant halftones.

The fact that juxtaposed colorant halftone dots behave purely additively also allows us to directly measure the colorimetric values of the light emitted by the fluorescent colorant patches under UV illumination, for example with a colorimeter. The color, i.e. the colorimetric values C of a printed fluorescent juxtaposed halftone colorant patch can then be predicted by simple addition of the contributing colorant colorimetric values $C_i$, weighted according to their effective surface coverages $u_i$:

$$C = \sum_{i=1}^{m} u_i \cdot C_i \tag{3}$$

where m is the number of colorants contributing to the halftone colorant patch, including as one colorant the unprinted black of the support. The colors C and $C_i$ are expressed in a linear color space, preferably the device-independent CIE-XYZ space.

A Color Space for Fluorescent Inks.

In order to map original colors into the reduced gamut of the fluorescent inks, it is important to work within a device independent color space. Let us characterize the colors produced by fluorescent juxtaposed colorant halftones in the widely used CIELAB color space. To reach this goal, we first convert emitted spectra into tri-stimulus CIE-XYZ values [Sharma 2003b]. The formula for converting a stimulus spectrum $[p_0, p_1, \ldots, p_{n-1}]$ to CIE-XYZ is:

$$\begin{bmatrix} X \\ Y \\ Z \end{bmatrix} = K \cdot \begin{bmatrix} \bar{x}_0 & \bar{x}_1 & \cdots & \bar{x}_{n-1} \\ \bar{y}_0 & \bar{y}_1 & \cdots & \bar{y}_{n-1} \\ \bar{z}_0 & \bar{z}_1 & \cdots & \bar{z}_{n-1} \end{bmatrix} \cdot \begin{bmatrix} p_0 \\ p_1 \\ \cdots \\ p_{n-1} \end{bmatrix} \tag{4}$$

where $\bar{x}_i, \bar{y}_i, \bar{z}_i$ are the coefficients of the CIE 1931 color matching functions and n is the number of considered discrete wavelengths within the visible wavelength range. The constant K is chosen so as to have a value Y=100 for respectively "a perfectly reflecting or transmitting diffuser", see R. W. Hunt, Measuring Color, Ellis Horwood, Chichester, England, 1991, p. 54. Since we have calibrated our spectrophotometer with a diffusely reflecting dark gray patch illuminated by a Xenon light source, the stimulus vector [1 1 . . . 1] yields the maximal diffuse light emission for which we expect Y=100.

The second step consists in converting from CIE-XYZ to CIELAB [Sharma 2003b]. This conversion includes a normalization in respect to a "white stimulus", which simulates the eye's adaptation to lightness. When observing an image printed with fluorescent inks under UV light, we do not have a "white reference" such as the paper white. In the present example, we have the white colorant, whose maximal spectral intensity is approximately 2.5 times lower than the maximal spectral intensity of the fluorescent blue ink. We therefore adopt as pseudo white stimulus the spectrum of the white colorant, multiplied by this factor of 2.5. This yields as pseudo-white reference the spectrum of the white colorant, scaled so that its maximum reaches the peak of the maximal spectral intensity present in the emitted colorant spectra.

Figure 6A:
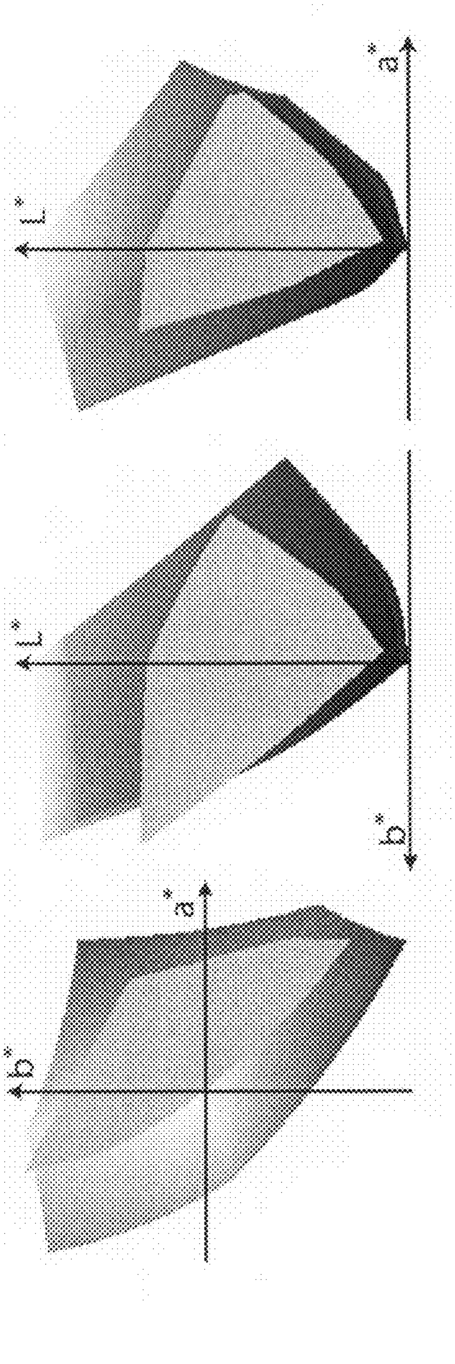
FIG. 6A shows the respective gamuts of an sRGB monitor (external shapes) and of fluorescent ink halftones (constant gray internal shapes) viewed under UV light projected onto the a*b*, L*b* and L*a* planes of the CIELAB color space.
Figure 6B:
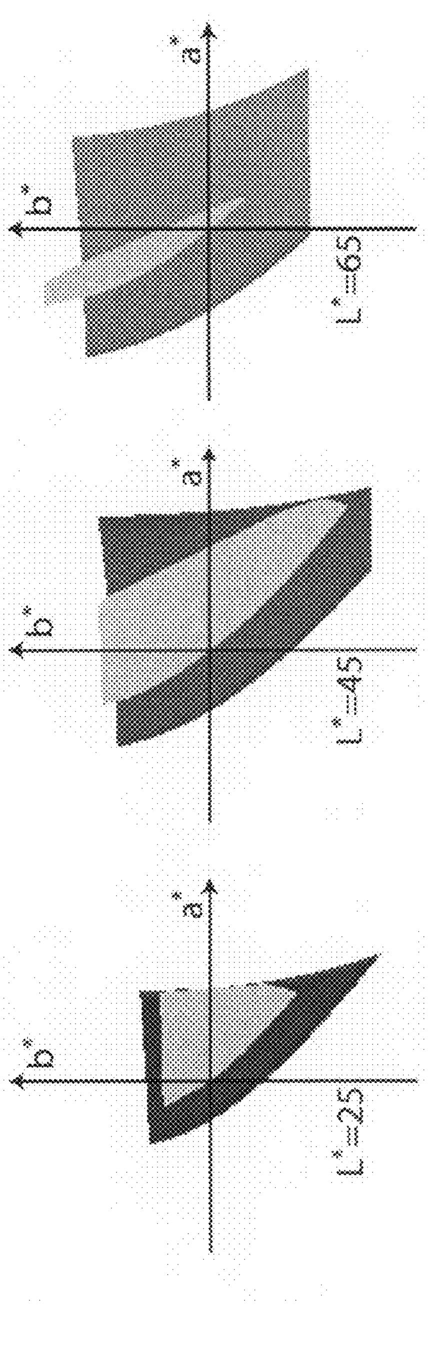
FIG. 6B shows the same gamuts as FIG. 6A as constant lightness slices.

With this procedure for converting emitted fluorescent spectra into device-independent colors, we may now compare the gamut of our fluorescent inks with the gamut of standard monitor colors, e.g. sRGB monitors. FIGS. 6A and 6B show projections of the gamuts into respectively the a*b*, L*b* and L*a* planes of the CIELAB color space as wells as several constant lightness (L*) slices. The boundaries of the set of printable fluorescent colors (shown in constant gray) are obtained by varying the relative surface coverages of the colorants. The colorant surface coverages are inserted into the spectral prediction model and the resulting emission spectra converted first to CIE-XYZ and then to CIELAB.

In the present example, the part of fluorescent ink gamut (gray) in the 3rd quadrant (green-blue color quadrant delimitated by the −a and −b axes), is lacking, since there is no green fluorescent ink. Nevertheless, by performing an adequate gamut mapping step, we map the input colors into the reduced gamut of the fluorescent inks and try to obtain the best possible approximation of the input colors. Green-blue colors are mapped to gray, to desaturated yellow or to bluish colors.

Gamut Mapping from a Full Color Space to the Reduced Fluorescent Ink Color Space.

The present gamut mapping problem requires compressing the input gamut into the gamut offered by the fluorescent inks. The proposed mapping should preserve color continuity and whenever possible smoothness, i.e. a continuous color wedge located in the original color space should be mapped into a continuous color wedge located in the reduced target gamut. In addition, among different possible mappings, the mapping preserving at least to a certain extent the original colors is preferred. For example, hues of original colors located in parts of the color space common to both the input and target gamuts should be preserved as much as possible. The presented gamut mapping algorithm is inspired by the gamut reduction method published by S. Chosson and R. D. Hersch, Color Gamut Reduction Techniques for Printing with Custom Inks, Conf. Color Imaging: Device-Independent Color, Color Hardcopy, and Graphic Arts VII, 2002, SPIE Vol. 4663, 110-120, which were developed for printing with daylight inks (e.g. Pantone inks) whose colors differ from classical cyan, magenta, yellow and black inks.

The present approach consists in mapping colors outside the available target gamut hues as desaturated "pseudo-gray" colors and colors inside the target gamut hues as close as possible to the original colors. As in most other gamut mapping methods, we perform the gamut mapping in the CIELAB color space which is related to the perceptual attributes lightness, hue, and chroma (see Morovic, J. 2003, Gamut mapping, in [Sharma 2003a], Chap. 10, pp. 639-685, hereinafter referenced as [Morovic 2003].

Let us first compute the gamut boundaries of the gamut formed by the fluorescent colorant emission. We establish in the CIE-XYZ color space a set of base tetrahedra whose vertices represent the colors of the fluorescent colorants and the black of the support. Since we would like to maximize the amount of unprinted black space, in a preferred embodiment, we always have a combination of white (W), black (K) and two chromatic colorants. Therefore, all base tetrahedra have in common the black-white axis. In the present example, for the set of selected colorants, the black-white axis is located at the boundary of the gamut (FIG. 8B, a*=0, b*=0). In the CIE-XYZ space, the resulting three adjacent base tetrahedra are formed by the colorants {K,W,B,M}, {K,W,M,R}, {K,W,R,Y}. Due to dot gain, the relationship between nominal colorant surface coverages and XYZ colorimetric values is not linear. The CIELAB color space within which we would like to obtain the gamut boundaries and map input colors to fluorescent colorant colors is also non-linear. For these reasons, we subdivide each base tetrahedron into 8 adjacent tetrahedra by creating a new vertex at each tetrahedron edge half-point. By recursively performing this operation e.g. 4 times on each of the three base tetrahedra, we obtain a total of 12288 tetrahedra whose vertices represent the respective nominal surface coverages of the contributing colorants. Corresponding emission spectra are predicted according to the adapted spectral Neugebauer model, converted first to CIE-XYZ and then to CIELAB. The set of all tetrahedra in CIELAB represents the target fluorescent colorant emission gamut. External tetrahedra faces represent the gamut boundaries. Each tetrahedron vertex represents a mapping between nominal surface coverages of the colorants and a CIELAB value. Since the tetrahedra are small, linear interpolation between tetrahedra vertices enables establishing the correspondence between CIELAB values and colorant surface coverages.

As in other gamut mapping methods [Morovic 2003], the first step in gamut mapping is to create a correspondence between the full CIELAB lightness range (L*=0 to L*=100) and the fluorescent colorant lightness range, in the present example the lightness range between L*=6.5 (unprinted black) and L*=69.5 (white colorant), by linearly scaling the lightness range of the fluorescent colorant gamut. In order to map colors outside the available target gamut hues as desaturated "pseudo-gray" colors and colors inside the target gamut hues as close as possible to the original colors, we partition the color space into several parts along hue planes.

Figure 8A:
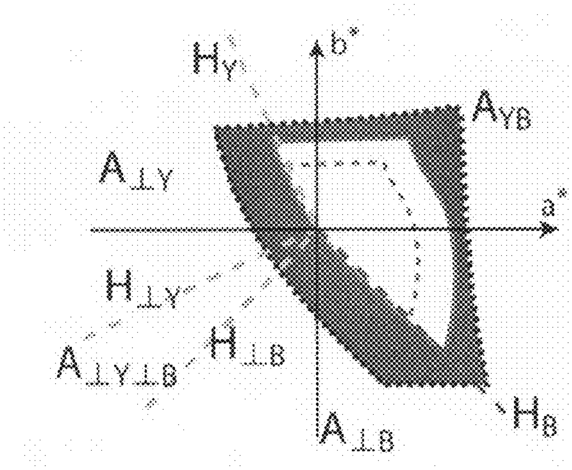
FIG. 8A shows a partition of the CIELAB color space into different hue domains.
Figure 8B:
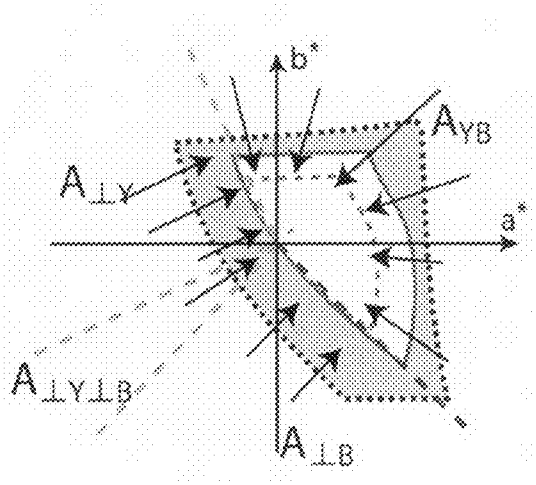
FIG. 8B shows the corresponding out-of-gamut color projection orientations.

One hue plane is given by the hue of the solid yellow fluorescent colorant (FIG. 8A, $H_Y$) and the other by the hue of the solid blue fluorescent colorant (FIG. 8A, $H_B$). These two hue planes approximately delimit the domain $A_{YB}$ of the hues present within the target fluorescent gamut. Its complement is the domain of hues outside the target gamut. Input colors located in that domain need to be projected into the target domain. For this purpose, we further partition the out-of-gamut hue domain into three parts, one part $A_{\perp Y}$ delimited by the yellow hue plane $H_Y$ and by its perpendicular hue plane $H_{\perp Y}$, the second part $A_{\perp B}$ delimited by the blue hue plane $H_B$ and its perpendicular hue plane $H_{\perp B}$ and the third part $A_{\perp Y \perp B}$ delimited by the hue half-planes $H_{\perp Y}$ and $H_{\perp B}$.

We further define within the target gamut a core gamut boundary (FIGS. 9A and 9B, 93), which is a compressed instance of the target gamut boundary 92 and which delimits a region of the color space that will be left unaltered, see L. W. MacDonald, J Morovic, K Xiao, A topographic gamut mapping algorithm based on experimental observer data, in Proc. of 8th IS&T/SID Color Imaging Conference, 2000, 311-317. The target gamut "boundary volume" located between the target gamut 92 and the core gamut 93 is the space within which out-of-gamut colors as well as boundary volume colors are mapped. This mapping is linear, as shown in FIG. 9A. Core gamut boundary points are obtained by projecting for a given lightness value the corresponding target boundary points perpendicularly towards the lightness axis. Input colors located within area $A_{YB}$ are linearly mapped along their constant lightness hue line into the target gamut boundary volume, as shown in FIG. 9A.

Figure 9B:
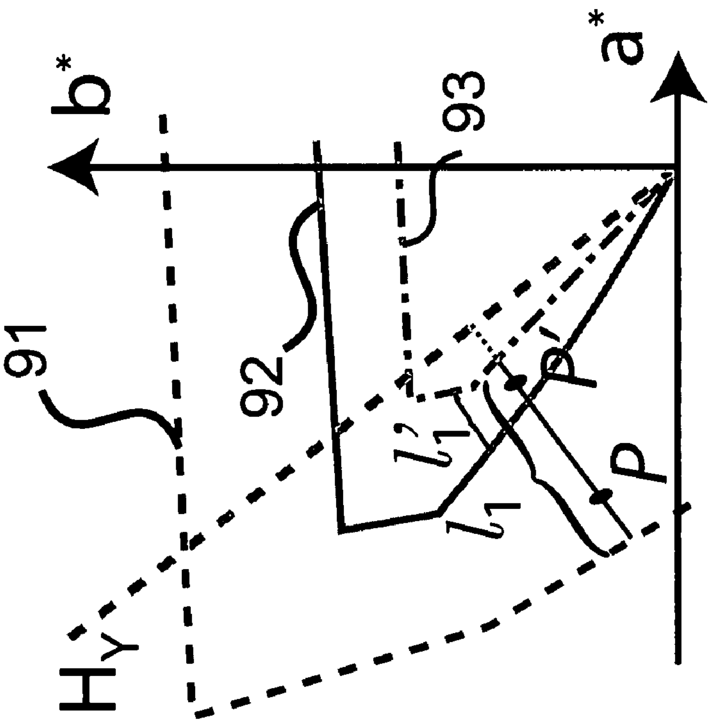
FIGS. 9A and 9B show the mapping of constant lightness hue line segment $l_1$ into target gamut hue line segment $l'_1$, and of out-of-gamut color P into target gamut color P' in two different regions of the color space.
Figure 9A:
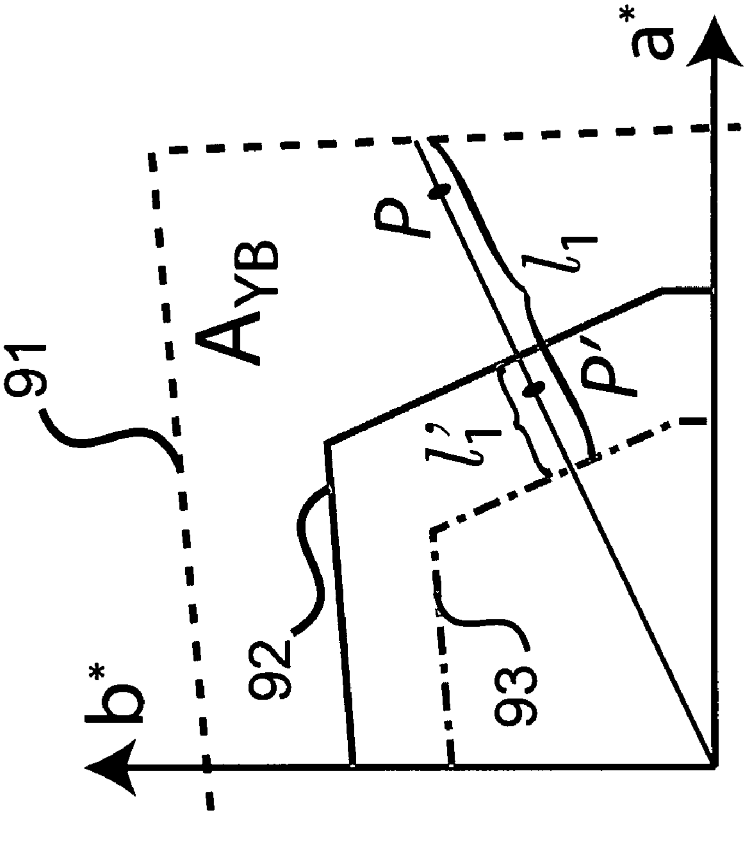

Mapping of input colors located in out-of-gamut areas $A_{\perp Y}$ (FIG. 8B) or respectively $A_{\perp B}$ of the input color gamut is performed by first projecting the colors perpendicularly towards the hue planes $H_Y$ or respectively $H_B$, intersecting the projections with the target gamut boundaries (external tetrahedra faces) and by mapping the line segments located between input color gamut boundary (FIGS. 9A and 9B, 91) and core gamut boundary 93 into the target gamut boundary volume (FIGS. 9A and 9B, delimited by 92 and 93). If there is no intersection with the target gamut boundary 92, the color projected into the hue plane is further projected towards the black-white axis and mapped onto the resulting target gamut boundary intersection point. Input colors located in areas $A_{\perp Y \perp B}$ are mapped by projecting them onto the black-white axis.

Converting Mapped Colors to Colorant Surface Coverages.

After having performed the gamut mapping of an input color, we need to determine the respective surface coverages of the fluorescent colorants capable of reproducing that mapped input color, when viewed under UV light. The location of the mapped input color within the CIELAB space, i.e. its location within a tetrahedron, indicates the colorants and their respective surface coverages for creating that color. Linear interpolation between tetrahedron vertices creates the correspondence between the mapped input color CIELAB calorimetric values and the corresponding nominal surface coverages of the contributing colorants. As mentioned in section "Measurement equipment, paper and printer", each color is reproduced by a combination of unprinted black, colorant white and two chromatic colorants.

Creation a Juxtaposed Screen Element Library.

Once the nominal surface coverages of the contributing colorants are known, they are printed according to the same fluorescent colorant halftoning algorithm that is used to calibrate the spectral prediction model. This halftoning algorithm has the specificity of trying to insert unprinted black at the boundaries between the printed colorant dots. This feature ensures that no overlap occurs between neighboring fluorescent ink dots and therefore the validity of our spectral prediction model, i.e. the emission spectrum of one halftone colorant is independent of the emission spectrum of the other halftone colorants.

In nearly all classical color halftoning methods such as clustered-dot color dithering, error-diffusion, blue-noise dithering, the ink layers are allowed to overlap, see C. Hains, C., S. G. Wang, K. Knox, Digital color halftones, in [Sharma 2003a], Chap. 6, pp. 385-490. In the present case, in order to avoid quenching which would shrink the fluorescent color gamut, we need a halftoning algorithm which avoids superposing fluorescent colorants, i.e. which does not yield overlapped screen dots. In addition, in case of dot gain and possible misregistration between the ink layers, screen dot overlaps should also be prevented. Juxtaposed halftoning, with colorant dots printed side by side and unprinted black evenly distributed between them, meets these requirements.

Figure 10A:
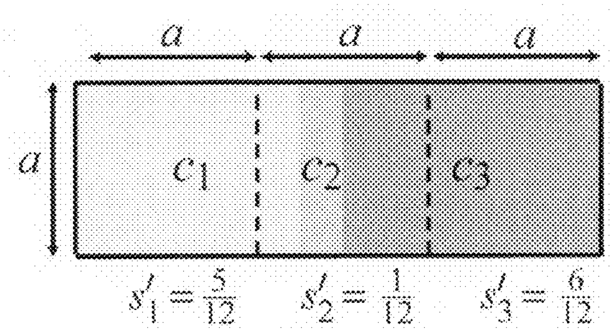
FIGS. 10A and 10B show a colorant screen surface $c_2$ that is laid out horizontally at different positions according to the surface coverages of neighboring colorants $c_1$ and $c_3$.
Figure 10B:
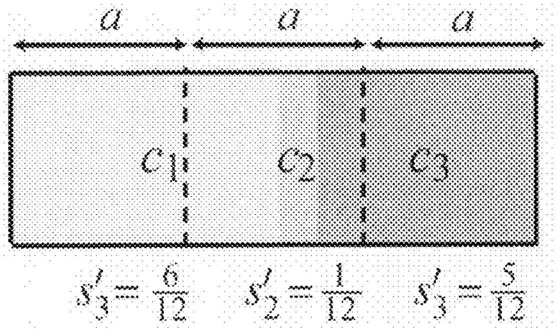

The exact position and extension of a screen element of one colorant depends on the amounts of the other colorants. For example, a surface coverage of $s_2=1/12$ of colorant $c_2$ is positioned differently if the surface coverage of the neighboring colorant $c_1$ is small and the one of $c_3$ is large or vice-versa (FIGS. 10A and 10B).

The fact that the colorant screen element position and growing behavior depends on the neighboring colorant surface coverages excludes dither matrix based halftoning techniques such as the ones taught in U.S. Pat. No. 7,054,038 to Ostromoukhov and Hersch. We therefore create a library of juxtaposed screen element halftones incorporating all possible halftone combinations of 3 colorants $c_1$, $c_2$, $c_3$ and unprinted black $c_4$. We start by defining the base cells for a uniform distribution of printed colorants, i.e. $s_1=s_2=s_3=1/3$. Starting with square cells of side a, one may easily create a diagonally oriented juxtaposed screen with a 3×3 juxtaposed screen dot cell array, containing in one row the cells $c_1$, $c_2$ and $c_3$, and in each successive row the same cells, but shifted by one position (FIG. 11). Such a 3×3 juxtaposed screen dot cell array has the advantage that a dot cell of a given colorant (e.g. $c_1$) has as its two direct horizontal neighbors and as its two direct vertical neighbors the two other colorants (e.g. $c_2$ and $c_3$).

Figure 13:
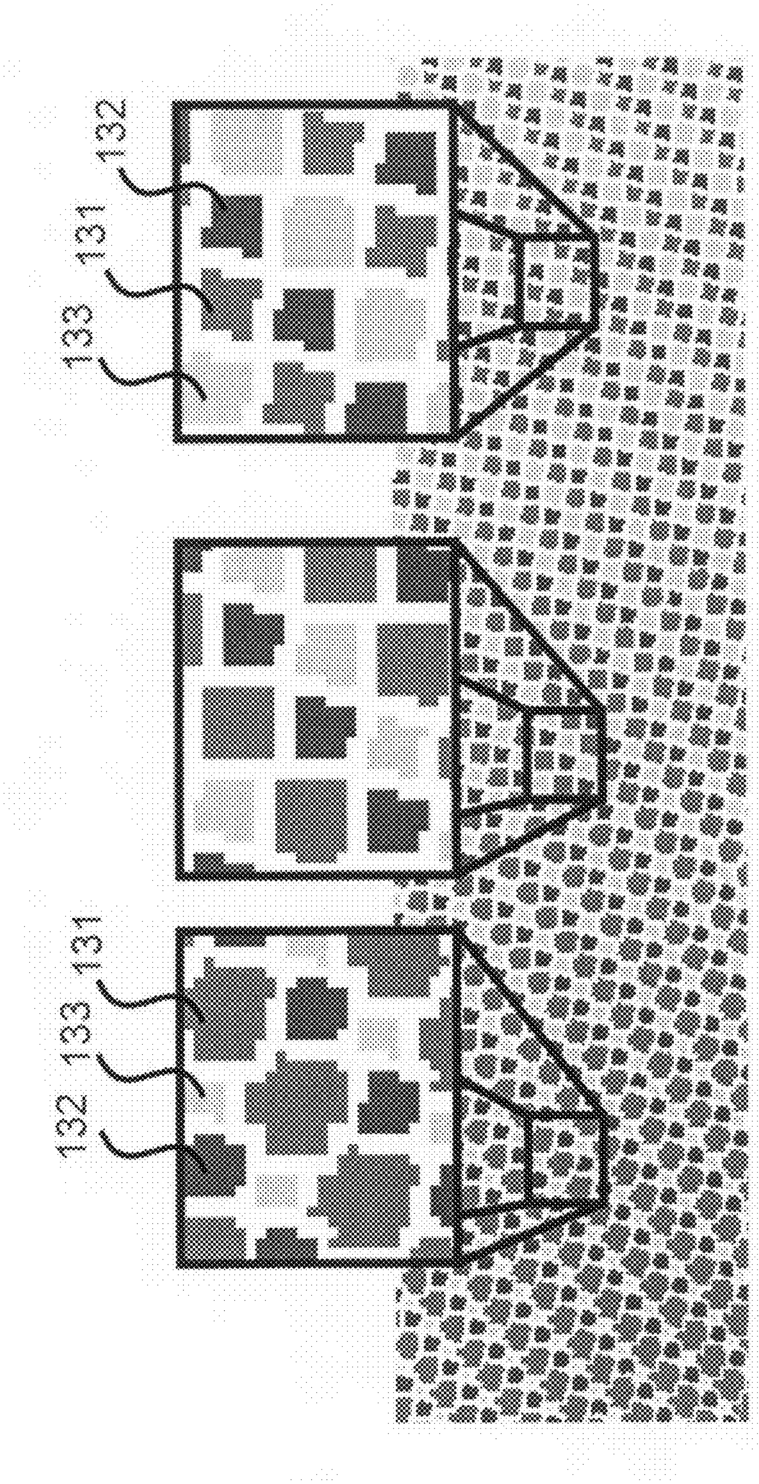
FIG. 13 shows a simple 2D color wedge halftoned according to the disclosed juxtaposed halftoning algorithm.

The juxtaposed screen dot cell array (FIG. 11) yields screen dots which have along one diagonal orientation a period of $a\cdot\sqrt{2}$, where a represents the size of a cell of the juxtaposed cell array. A juxtaposed colorant dot screen is formed by oblique juxtaposed screen dot lines, as shown in FIG. 13. The period between juxtaposed screen dot lines of a same colorant is $3\cdot a\sqrt{2}$.

In order to distribute the unprinted black evenly between juxtaposed colorant screen dots, we first compute from the initial distribution of colorant surface coverages $s_1$, $s_2$, $s_3$ a derived distribution $s_1'$, $s_2'$, $s_3'$ covering the full juxtaposed screen surface without leaving holes. In a preferred embodiment, the unprinted black surface part $s_{black}$ is evenly distributed among the colorants, i.e.

$$s_{black} = 1 - s_1 - s_2 - s_3 \tag{5}$$

$$s_1' = s_1 + \frac{s_{black}}{3},\ s_2' = s_2 + \frac{s_{black}}{3},\ s_3' = s_3 + \frac{s_{black}}{3} \tag{6}$$

Figure 12A:
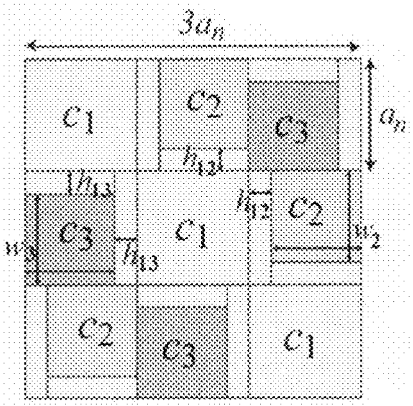
FIGS. 12A and 12B show juxtaposed screen element surfaces growing both horizontally and vertically over neighboring cells, with, in FIG. 12A a single colorant $c_1$ growing over its two neighbors $c_2$ and $c_3$ and in FIG. 12B, the colorants $c_1$ and $c_2$ growing over their common neighbor $c_3$.

After having laid out the derived colorant surfaces, we will then reduce each surface by $S_{black}/3$. This will ensure that the unprinted space is correctly placed around each colorant surface. In order to generate juxtaposed clustered colorant screen dots, we spread out the part of each colorant with surface coverage larger than its initial cell surface both horizontally and vertically into its neighboring dot cells in proportion to the surface coverage ratio of their unprinted cell space (FIG. 12A). The total surface of three adjacent cells $c_1$, $c_2$ and $c_3$ forms a nominal surface of unit size. Therefore, a single cell has a nominal surface of ⅓ and a corresponding nominal cell side $a_n$=*mt;epmrl;*√⅓*rlxmx*. The real cell side a will be assigned a certain number of pixels at the output image resolution. Then corresponding sizes within the juxtaposed cell array need to be scaled according to the ratio between real cell side and nominal cell side.

FIG. 12A shows the case $s_1'>1/3$, $s_2'<1/3$, and $s_3'<1/3$, i.e. where the colorant surface $(s_1'-1/3)$ is spread out over neighboring cells $c_2$ and $c_3$. Applying simple geometric considerations, we compute the thickness h of the horizontal and vertical bands allowing to distribute the surface $s_1'-1/3$ from cell $c_1$ into horizontal and vertical neighboring cells $c_2$ and $c_3$, according to the ratio of $1/3-s_2'$ and $1/3-s_3'$. The equation system shown in FIG. 12A comprises the surfaces $s_{12}'$ and $s_{13}'$ representing respectively the part of surface $s_1'$ spilling out into cells $c_2$ and the part of it spilling out into cells $c_3$. In order to obtain the band thicknesses $h_{12}$ and $h_{13}$, we solve this system of equations. We obtain $$h_{12} = \frac{1-\sqrt{1-s_1+2s_2-s_3}}{\sqrt{3}} \tag{7}$$

and $$h_{13} = \frac{1-\sqrt{1-s_1-s_2+2s_3}}{\sqrt{3}}$$

Figure 12B:
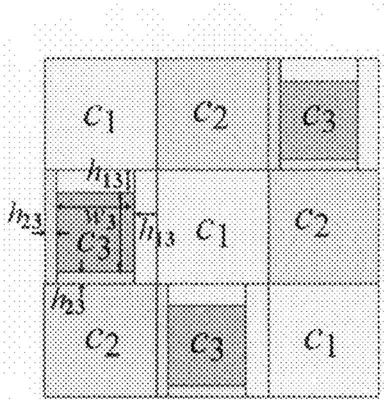

FIG. 12B shows the second case $s_1'>1/3$, $s_2'>1/3$, and $s_3'<1/3$, where respective surfaces of both $c_1$ and $c_2$ spill out into cells $c_3$. By solving the set of equations for the band thicknesses $h_{13}$ and $h_{23}$, we obtain $$h_{13} = \frac{2s_1-s_2-s_3}{\sqrt{3}\cdot\left(1+\sqrt{1-s_1-s_2+2s_3}\right)} \tag{8}$$

and $$h_{23} = \frac{s_1-2s_2+s_3}{\sqrt{3}\cdot\left(1+\sqrt{1-s_1-s_2+2s_3}\right)}$$

This juxtaposed screen dot cell growing strategy yields well clustered juxtaposed screen dots.

In summary, colorant surface layouts are computed according to ratios of their surface coverages by calculating how much individual colorants spread out into neighboring colorant cells. The layout of a colorant i larger than its initial cell size is formed by its colorant cell $c_i$ and by the bands $h_{ij}$ representing how much such a colorant spreads out into its neighboring colorant cells j.

After partitioning the screen element space according to the respective surface coverages $s_1'$, $s_2'$, $s_3'$, the unprinted black is restored between the juxtaposed screen dots by scaling down each polygonal screen element shape so as to recover its original surface coverage. In order to create raster screen elements having a surface close to the surface of their respective polygons (polygons defining the surfaces $s_1$, $s_2$ and $s_3$), we need oblique polygon borders. A rasterization of rectangles with horizontal and vertical edges yields discrete surfaces whose size does not increase smoothly when slightly increasing their width or height. A slightly oblique square, e.g. a square having an angle of a tan(1/m), with $m \in Z$, yields rectangles of m different discrete sizes when translating one of its edge lines from zero to one unit in the x or respectively y direction.

We therefore rotate the initial quadratic screen cells of side a forming the screen tile by a small angle (e.g. a=a tan(1/a)).

We also scale them slightly (e.g. by $s=\sqrt{a^2 1/a}$) in order to have their vertices located on the grid. After having applied this transformation to all polygons of the screen tile, we rasterize them and obtain the juxtaposed screen element library entry associated to the desired fluorescent colorant surface coverages $s_1$, $s_2$, $s_3$ and the unprinted black coverage $s_{black}=1-s_1-s_2-s_3$.

The juxtaposed screen element library with n+1 different intensity levels for a juxtaposed screen element surface size n is constructed by iterating for colorant $c_1$ over surface coverages $s_1$, from 0 to 1 in steps of 1/n, for colorant $c_2$, by iterating over surface coverages from 0 up to the value of $1-s_1$, and for colorant $s_3$ from 0 up to the value of $1-s_1-s_2$ (constraint: $s_1+s_2+s_3 \leqq 1$). A small program counting the number of all possible screen elements as a function of the number of intensity levels n+1 yields the number of screen elements that must be stored in the library (Table 1). According to T. M. Holladay, Optimum algorithm for halftone generation for displays and hard copies, in Proceedings of SID, vol. 21, 1980, pp. 185-192, one may represent an oblique screen element as a rectangular screen tile comprising the same number of pixels as the original obliquely oriented screen element, virtually replicated by a vector $(t_x, t_y)$ so as to pave the plane. For a juxtaposed screen element having 3 dot cells, with orientation a=a tan(1/a), the corresponding rectangular tile comprises $n=3(a^2+1)$ pixels. For example, a juxtaposed screen element of 3 dot cells, each having a surface of 65 pixels (a=8) yields a rectangular tile of size 195×1 pixels, with 3 bits per pixel for 5 colorants. By packing 8 pixels into 3 bytes, only 74 bytes per screen tile are needed. The corresponding juxtaposed screen element library requires a total memory size of 1'293'699·74 bytes≈95.7 MB.

TABLE 1

Number of screen elements in function of the number of intensity levels.

| | Nb of intensity levels | | | |
|---|---|---|---|---|
| | 31, (a = 3) | 79, (a = 5) | 196, (a = 8) | 247, (a = 9) |
| Nb of screen elements | 5984 | 23'426 | 1'293'699 | 2'573'000 |

If, as in offset printing, there are colorants which comprise instead of full size ink halftone dots, middle or respectively low size ink halftone dots, then additional juxtaposed screen element library entries for middle or respectively low size halftone dots are created by taking the full size halftone dot polygons and scaling them down for example to ⅔, respectively ⅓ of their full size. These polygons are rasterized in the same way as the full size halftone dot polygons.

Fluorescent Juxtaposed Halftoning.

Once the juxtaposed screen element library is constructed, possibly also comprising entries for middle size and low size halftone dots, fluorescent halftoning a color image simply consists of traversing the output image space scan line by scan line and pixel by pixel and of obtaining for each pixel the corresponding input image location and its source image color. One obtains the respective fluorescent colorants and their surface coverages by accessing a table providing the mapping between CIELAB calorimetric values and colorant surface coverages. Each entry within that table has been previously deduced from the tetrahedra which tile the CIELAB fluorescent colorant gamut (see FIG. 7 and section “A color space for fluorescent inks”). The screen tile within the juxtaposed screen element library corresponding to the colorant surface coverages $s_1$, $s_2$ and $s_3$ is accessed, and the colorant of the current pixel is read and copied to the current output image pixel.

In the case that a colorant is made of a superposition comprising full size, middle size and/or small size ink halftone dots, the colorant that is read is formed by the on/off bits of the entries corresponding to the full size, middle size, respectively low size dot halftones which are read from the juxtaposed screen element library. The colorant of the current pixel is copied into the current output image pixel by copying the on/off bits to the corresponding pixel location within the output image ink layers.

In order to illustrate juxtaposed halftoning, FIG. 13 shows an example of a 2D color wedge halftoned according to the juxtaposed halftoning algorithm described above, using as colorants the standard inks cyan, magenta and yellow and the paper white, visible under day light. The surface coverage of cyan 131 increases from top to bottom and from right to left and the surface coverage of yellow 133 increases from left to right. The surface coverage of magenta 132 is constant everywhere. Nevertheless, since the surface coverages of the colorants surrounding the magenta colorant vary, the position and discrete layout of the magenta screen dots also varies. Whenever possible, unprinted paper is surrounding each juxtaposed screen dot. For fluorescent colorant halftoning, similar halftone dots are formed, but with the selected fluorescent colorants (e.g. white+2 chromatic colorants) instead of cyan, magenta, yellow, and with the unprinted space between the halftone dots formed by unprinted black instead of paper white.

Creating Juxtaposed Screens with Variable Screen Element Sizes.

Figure 14B:
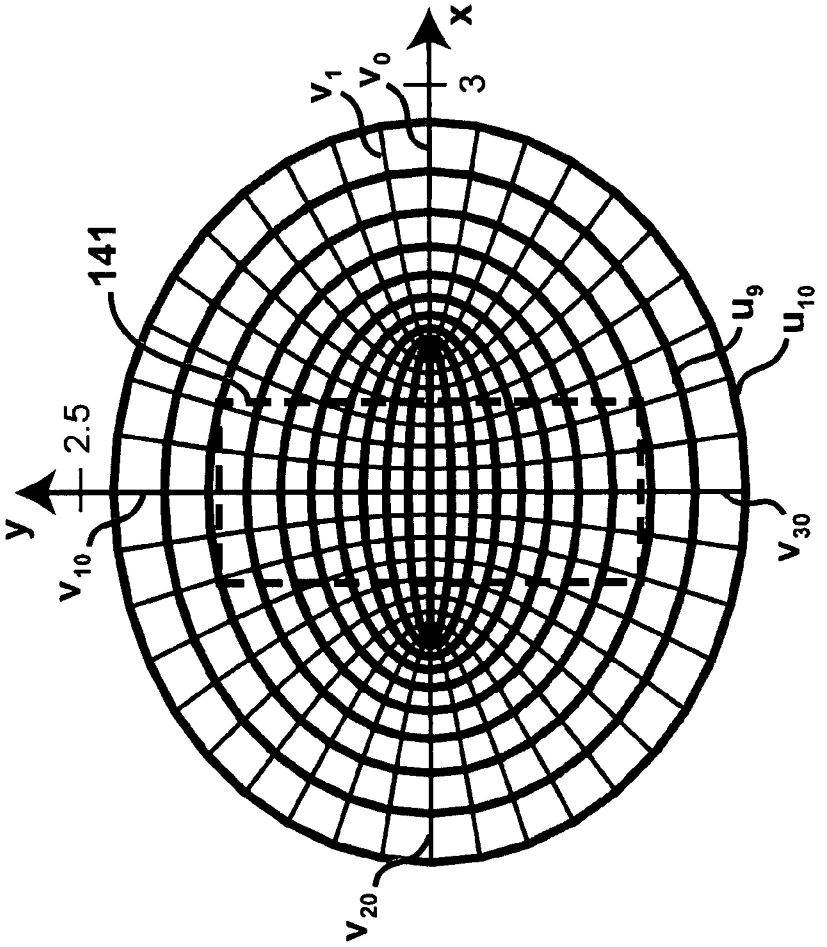
FIGS. 14A and 14B show respectively an original juxtaposed screen and a geometrically transformed juxtaposed screen comprising screen elements of smoothly increasing sizes.

One of the main advantages of the present fluorescent image generation method resides in the fact that a set of inks can be used which significantly differs from red, green and blue emitting fluorescent inks. However, in order to make this feature visible by a person observing the printed image under UV light, at least part of the fluorescent image should be halftoned at a screen resolution allowing one to see the individual juxtaposed screen elements with the naked eye, e.g. with a juxtaposed screen element cell size a as large as 0.5 mm or 1 mm. In order to achieve this goal, one variant of the present invention consists of creating a juxtaposed screen whose juxtaposed screen elements increase in size across the fluorescent image, for example from the center towards the exterior of the fluorescent image (FIG. 14B).

A variable size juxtaposed screen comprising juxtaposed screen elements of smoothly increasing sizes may be created by applying a two-dimensional geometric transformation to the original juxtaposed screen. This can for example be carried out at image halftoning time by inverse mapping, i.e. by converting the current output image coordinate (x,y) in the transformed space (FIG. 14B) back into the screen's original (u,v) coordinate (FIG. 14A), and then, by accessing the corresponding location of the juxtaposed screen element library.

Figure 14A:
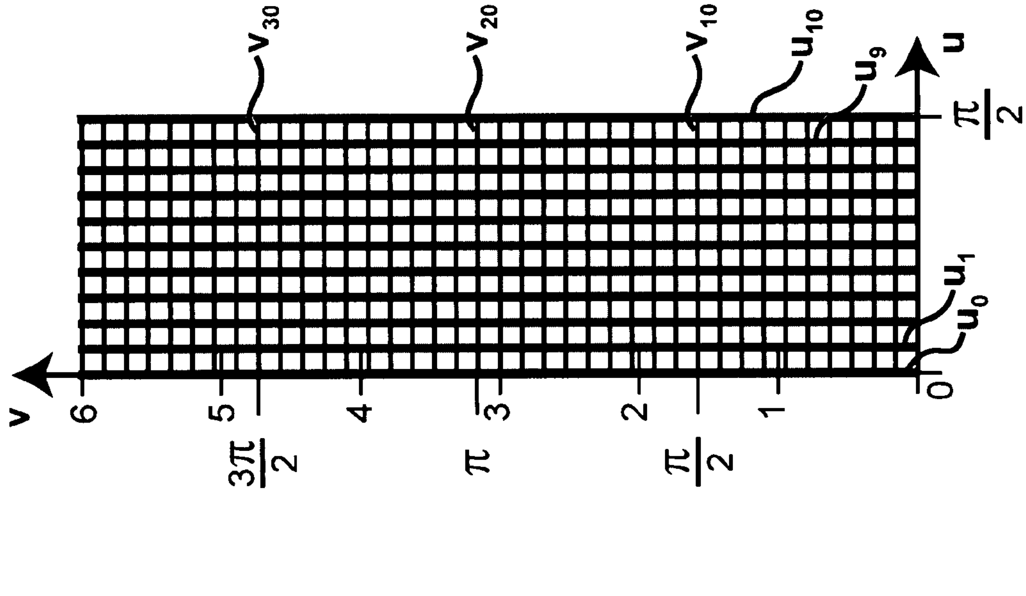

As an example, FIG. 14A shows an original juxtaposed screen whose screen cells have a rectangular layout. FIG. 14B shows the same screen cells after geometric transformation according to the conformal mapping function $$z = a \cosh w, \quad (9)$$

with z=x+i*y expressing complex coordinates in the transformed space and w=u+i*v expressing complex coordinates in the original space. The scalar real parameter a defines the distance 2*a between the focal points of the resulting ellipses (FIG. 14B). The conformal mapping can be decomposed into a two-dimensional mapping from an original space (u,v) into a transformed space (x,y) according to the following two-dimensional geometric transformation (see P. Moon, E. Spencer, Field Theory Handbook, Springer Verlag, 1971, $2^{nd}$ edition, pp. 51-75, hereinafter referenced as [Moon and Spencer 1971]):

$$x = a \cosh u \cos v$$

$$y = a \sinh u \sin v \quad (10)$$

The example juxtaposed screen grids of FIGS. 14A and 14B illustrate the concept of juxtaposed screen element grid transformation. Constant u-lines, respectively v-lines in the original domain, such as $u_9$, $u_{10}$, $v_{10}$, $v_{20}$, $v_{30}$, (FIG. 14A) are shown after transformation, in the transformed domain (FIG. 14B). In a real application, both the original grid and the transformed grid have a much higher grid line density than the grid density of FIGS. 14A and 14B.

Within the domain of the transformed space, one may select a sub-domain where the fluorescent image is to be laid out, for example the rectangular sub-domain 141 bordered by the dashed lines of FIG. 14B. The inverse transformation [Moon and Spencer 1971], in the present example, the conformal mapping $$w=a1/(\cos h\, z), \tag{11}$$

can be decomposed into a two-dimensional mapping from the transformed space (x,y) back into the original space (u,v) according to the following two-dimensional geometric transformation:

$$u=a \cos h\, x \cos y/(\cos h^2 x-\sin^2 y)$$

$$v=a \sin h\, x \sin y/(\cos h^2 x-\sin^2 y) \tag{12}$$

This two-dimensional inverse transformation may be used for mapping output image coordinates (x,y) back into the original rectangular juxtaposed screen (u,v).

Other geometric transformations which smoothly convert a rectangular juxtaposed screen (e.g. with a screen element cell size a of 1/150") into a curvilinear lower frequency juxtaposed screen (e.g. with a screen element cell size a of 1/25") are possible, see [Moon and Spencer 1971].

Figure 15A:
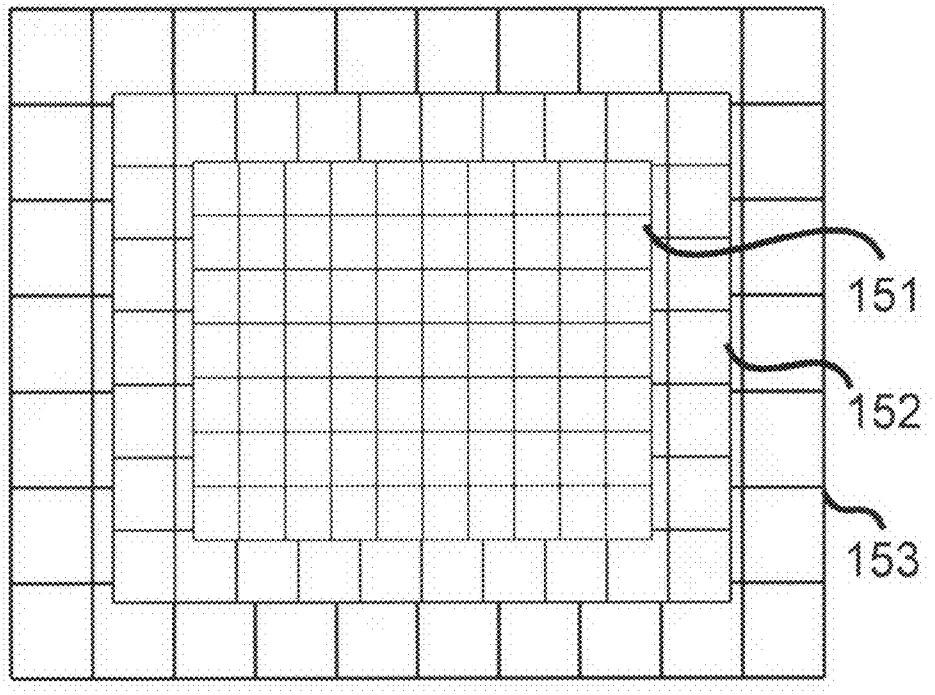
FIG. 15A shows a screen made of several parts, each part comprising screen elements of a different size.
Figure 15B:
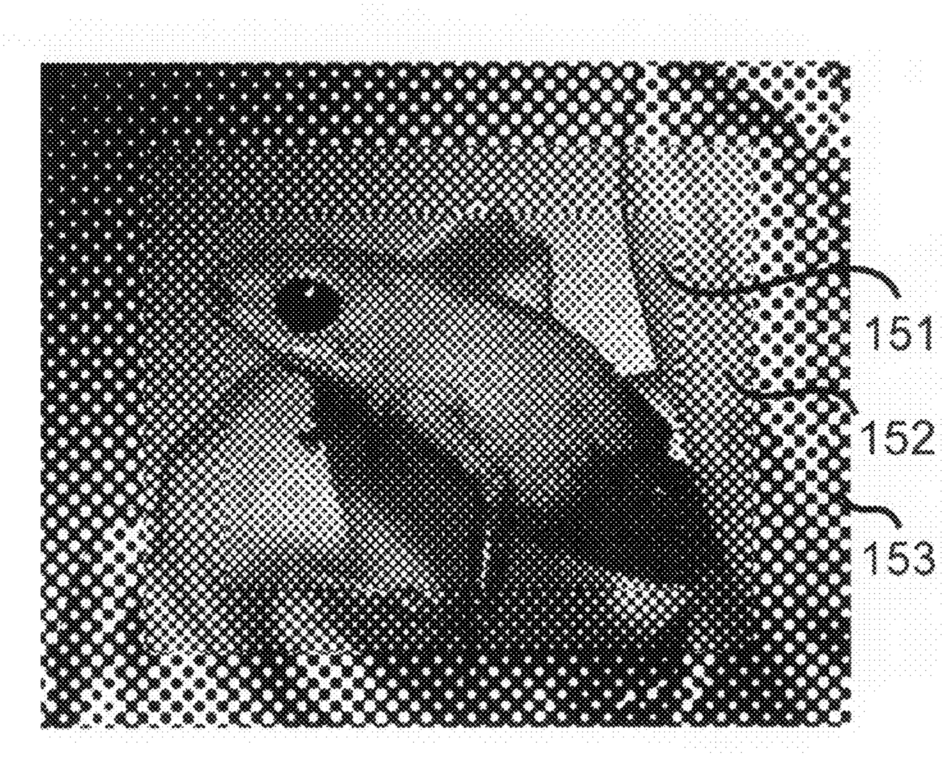
FIG. 15B shows a black-white image halftoned with the composed screen of FIG. 15A.

One may also place side by side regions comprising the original juxtaposed screen and regions comprising a lower frequency juxtaposed screen. For example, as shown in FIG. 15A, one may create from the interior of the image towards the exterior of the image halftone screen frames (e.g. 151, 152, 153) of increasing periods. FIG. 15B gives an example of a black-white image halftoned with a classical clustered-dot dithering algorithm, with a composed screen similar to the one of FIG. 15A. In a similar manner, one can create a composed juxtaposed screen composed of juxtaposed screen frames of increasing screen periods.

Resulting Fluorescent Color Images.

Figure 16:
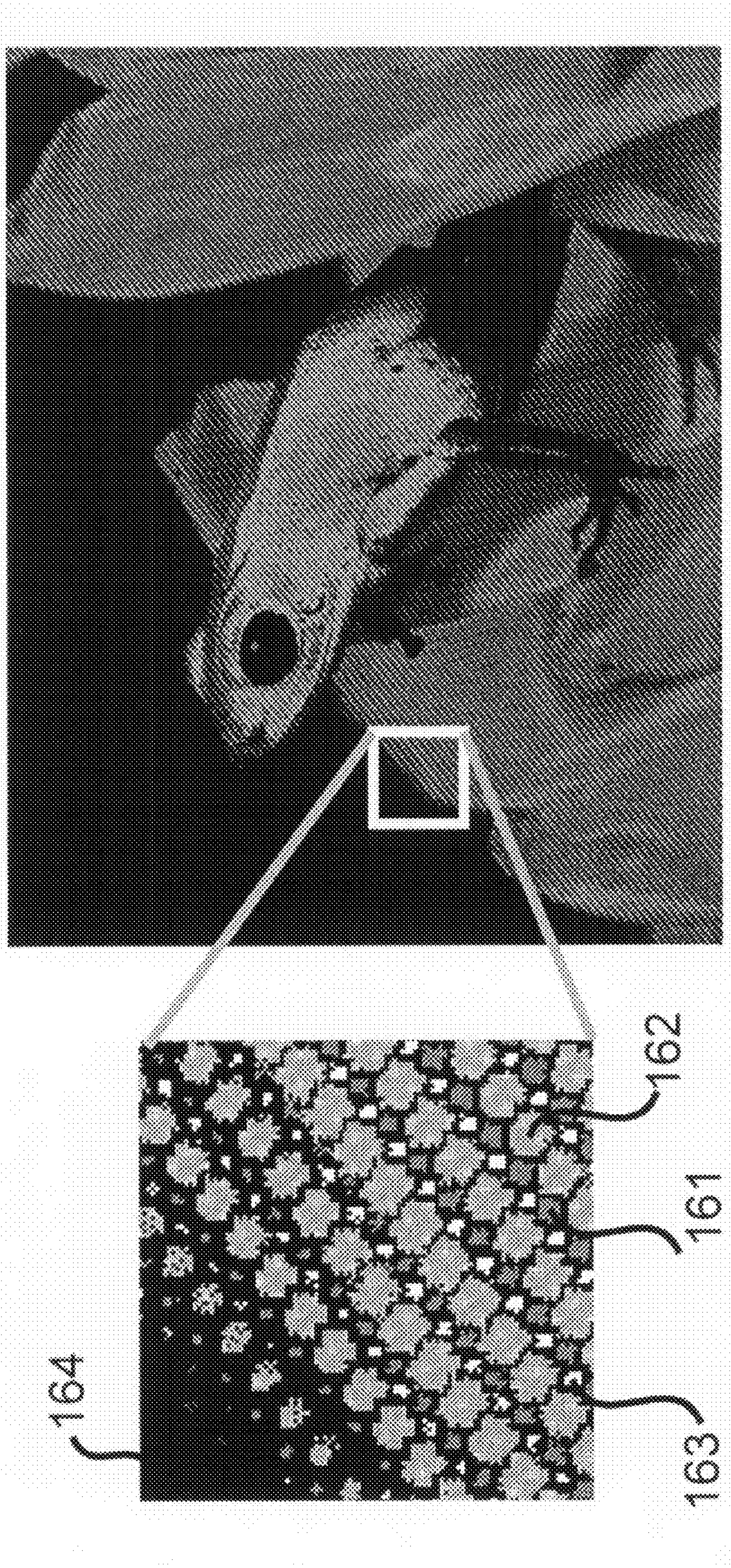
FIG. 16 shows a simulated fluorescent image produced by juxtaposed halftoning, with different gray levels 161, 162 and white 163 representing the different color colorants.

Color images printed with fluorescent inks according to the methods developed in the previous sections need to be observed under UV light. In order to demonstrate the proposed approach without having to see the images under UV light, we show in FIG. 16, with gray levels replacing the colorants, the simulated halftoned fluorescent image. In the zoomed part of FIG. 16, the three juxtaposed colorant halftones are represented by dark 161, middle 162 and white 163 halftone dots. Unprinted black is represented by black 164.

Method for Printing Invisible Fluorescent Color Images with Freely Selected Fluorescent Inks.

We created a method for reproducing color images with a set of freely chosen invisible fluorescent inks, the set comprising preferably at least one ink differing from red, green and blue fluorescent inks. For a new set of fluorescent inks, the initialization comprises the steps of (1) selecting a set of inks possibly with one fluorescent ink differing from red, green and blue fluorescent inks, (2) creating additional fluorescent colorants by superposing two or more of the selected fluorescent inks at possibly reduced dot sizes in order to reduce quenching effects, (3) establishing the gamut of the fluorescent colorants in a colorimetric space such as CIELAB, (4) mapping input image colors into the fluorescent colorant gamut, and (5) creating a table establishing the correspondence between input colors and the surface coverages of fluorescent colorants to be printed.

Independently of the selected inks and the newly created colorants, one needs to construct the juxtaposed screen element library with n+1 different intensity levels for a screen element surface size n by iterating for each colorant $c_1$ over its surface coverages $s_1$, from 0 to 1 in steps of 1/n, for colorant $c_2$, by iterating over surface coverages from 0 up to the value of $1-s_1$, and for colorant $s_3$ from 0 up to the value of $1-s_1-s_2$. In the case that some colorants are printed with ink halftone dots at a reduced dot size, the juxtaposed screen element library is expanded by creating for all surface coverages new entries for screen elements at the corresponding reduced halftone dot sizes.

After initialization, printing invisible fluorescent images with the selected set of fluorescent inks consists in traversing the output image space scan line by scan line and pixel by pixel and of obtaining for each pixel the corresponding input image location and its source image color. One obtains the respective fluorescent colorants and their surface coverages by accessing the previously established table providing the mapping between colorimetric values and colorant surface coverages. The juxtaposed screen element within the juxtaposed screen element library corresponding to the surface coverages of the colorants is accessed, and the colorant of the current pixel is read and copied to the current output colorant image pixel. Then, for certain printers such as ink-jet printers, colorant information is converted into ink pixel dot size information and sent to the printer. In other printing devices such as offset, the output colorant image is divided into its ink layers and the ink layers are separately sent to the plate making device (for offset printing) or to the printing device, e.g. an electro-photographic printer, a thermal transfer printer, an ink-jet printer operating with ink layer separations, etc. . . .

Applications which Benefit from Fluorescent Color Images.

A primary application is the creation of color images for protecting security documents such as bank notes, passports, ID cards, entry tickets, travel documents, checks, vouchers or valuable business documents. A further application is the protection of valuable articles such as CDs, DVDs, software packages, medical drugs. Further applications may combine decorative and protective aspects such as wine bottles, perfumes, watches, fashion articles, vehicles (bicycles, motorbikes, cars) and clothes (e.g. dresses, skirts, blouses, jackets and pants). Further applications are mainly decorative such as commercial art, publicity displays, fashion articles, and night life, where digitally produced fluorescent images viewed under UV illumination at night or in the dark have a strongly appealing effect. In some of the applications, the image is invisible and only revealed by the persons checking the authenticity of the document or the valuable article, by illuminating it with a UV light source. In other applications, the UV light source is fixed and continuously illuminates the fluorescent color image. For example, in the dark, a fluorescent UV light source may illuminate a fluorescent color poster informing about a currently running exhibition. Or in a night club, the UV light may illuminate the attendees, whose clothing incorporate digitally produced fluorescent color images.

Layout of Fluorescent Color Images and their Combination with Printed Information Visible in Day Light.

Figure 18:
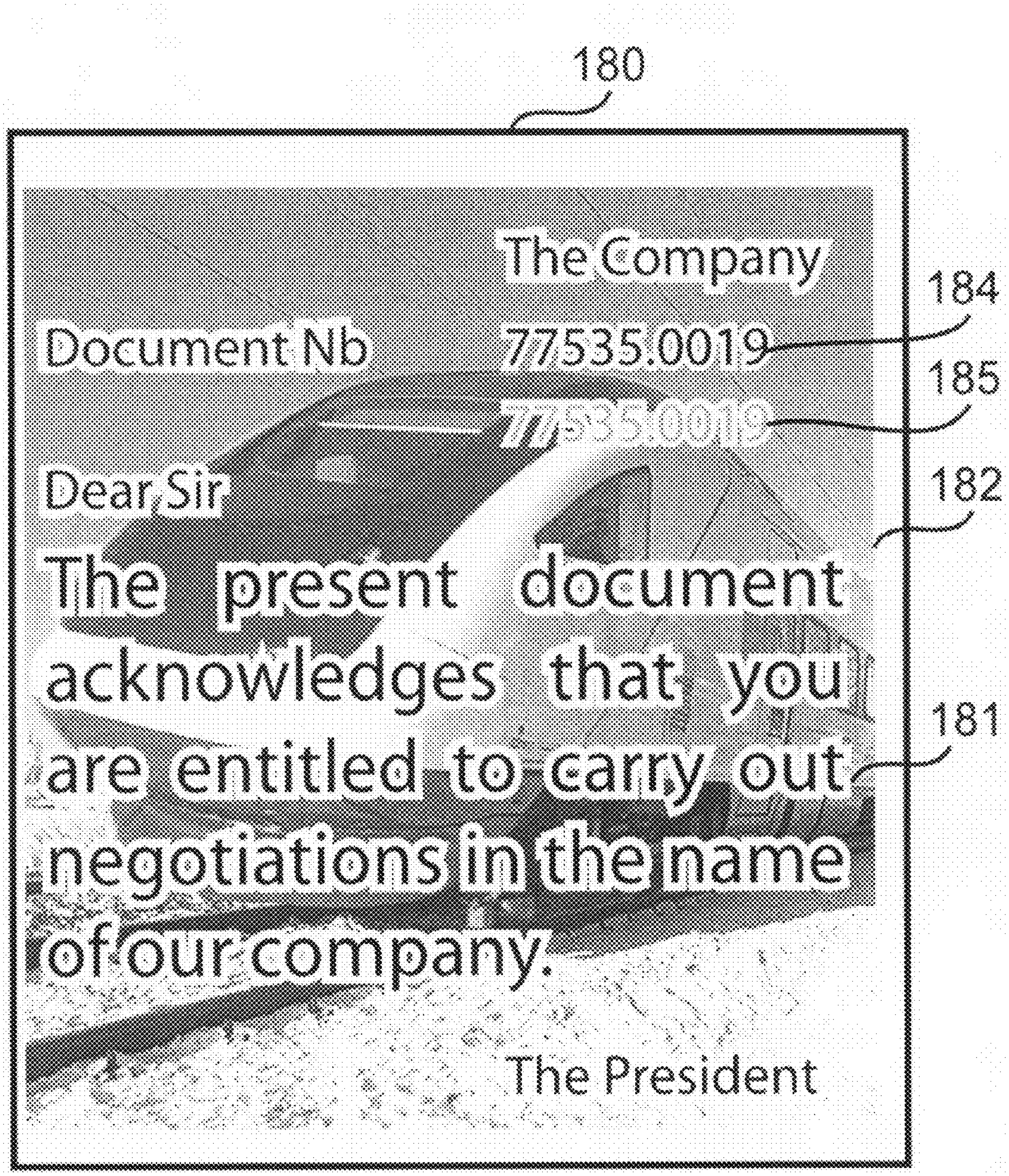
FIG. 18 shows a business document 180 comprising a background color fluorescent image 182 and the same document number visible under normal light 184 and under UV light 185.
Figure 19:
FIG. 19 shows a check printed on demand with all the required information printed as text visible under day light and with a fluorescent color image 191 laid out so as to surround the individualized text parts.

The Fluorescent color images invisible or barely visible in day light can be laid out as background 182 of a security document (FIG. 18, 180), on which visible information is printed 181. Under UV light, the fluorescent color image 182 appears and allows verifying the authenticity of the document. It is also possible to create as fluorescent color image an image which contains the same information or information derived from the one that is visible under day light, for example the same document number 185 as the number 184 printed on that document, visible under day light. As FIG. 19 shows, one may also individualize the layout of the fluorescent color image 191 by placing it in the space surrounding 192 the printed information visible under day light.

Figure 20A:
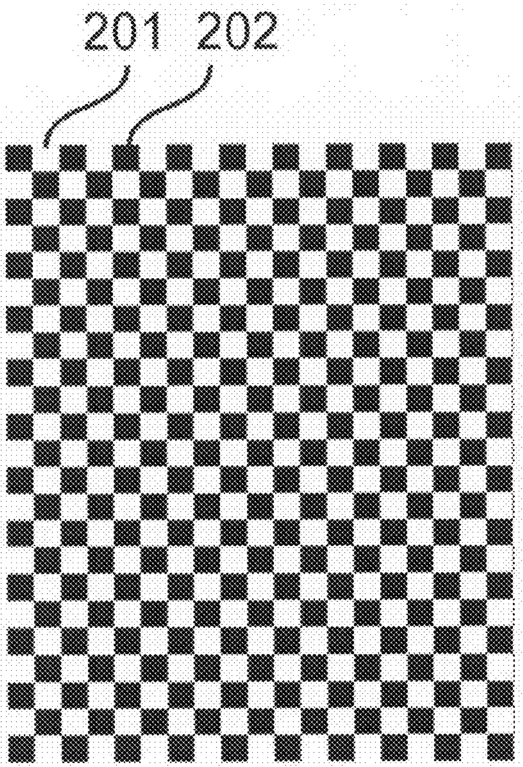
FIG. 20A shows a checkerboard pattern used as a mask to place a normally visible color image in the white cells 201 and the color image visible under UV light in the black cells 202.
Figure 20B:
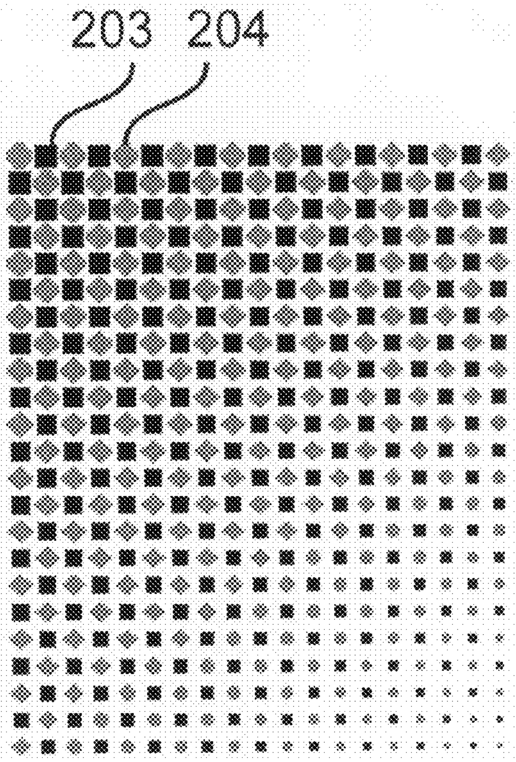
FIG. 20B shows the corresponding interleaved double image, where the cells corresponding to the white cells of FIG. 20A are allocated to the normally visible color image 203 and the cells corresponding to the black cells of FIG. 20A are allocated to the color image 204 visible under UV light.

A further possibility is to superpose a color image visible under day light with a color image visible only under UV light by subdividing the space of the image into for example a checkerboard pattern (FIG. 20A), where one set of regions (e.g. the white squares 201) displays the color image 203 visible under day light and the second set of regions 202 displays the fluorescent color image 204 visible under UV light. The two color images can either be derived from a same original color image or may form two completely different color images (FIG. 20B).

System for the Creation of Fluorescent Images Visible Under UV Light.

Figure 21:
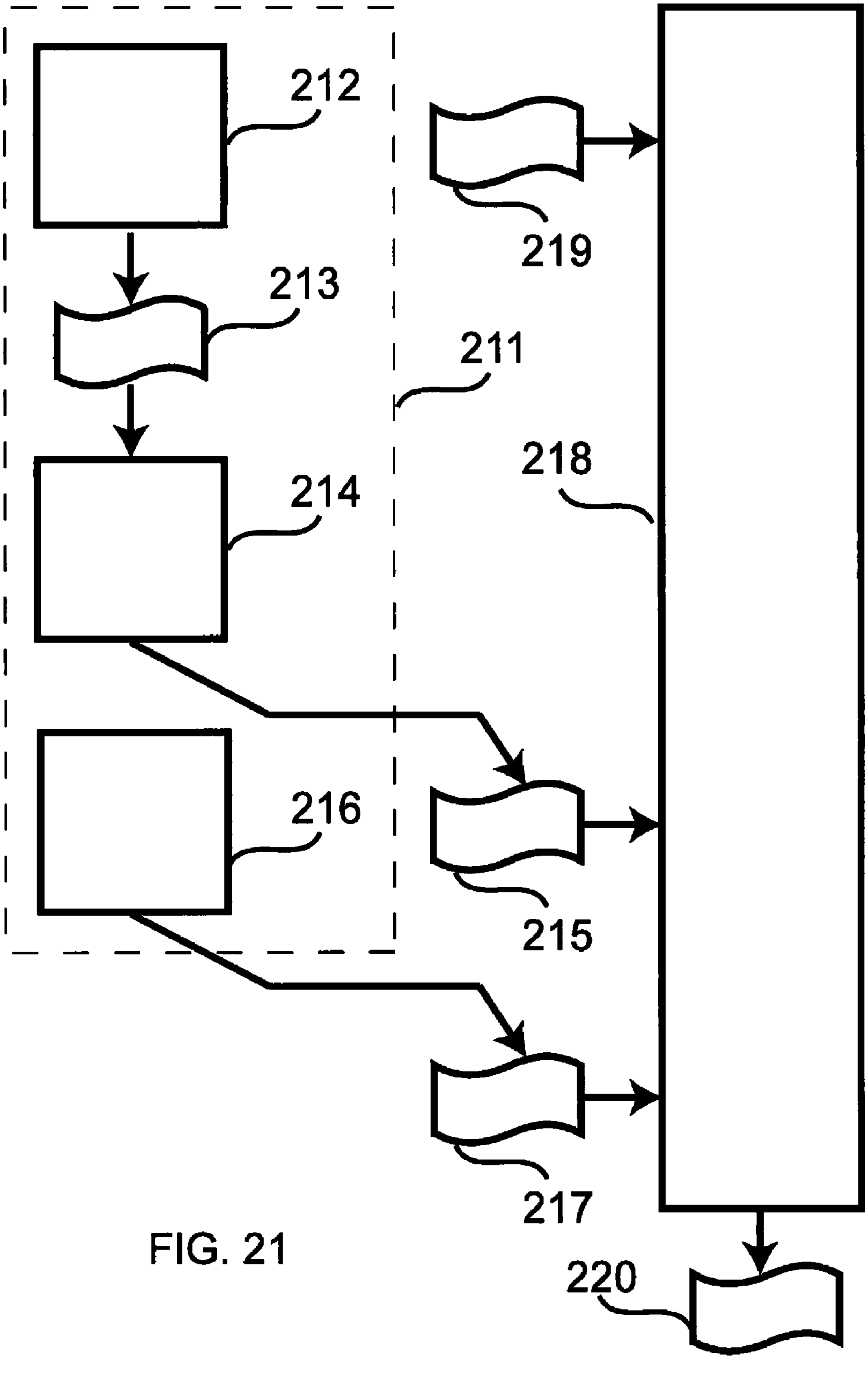
FIG. 21 shows a computing system for creating fluorescent images visible under UV light, with software modules for printing system initialization 211 and a juxtaposed halftoning software module 218 for generating the output fluorescent color image.

The system for creating fluorescent images visible under UV light (FIG. 21) comprises a computer running several software modules which (a) initialize the printing system and (b) create the fluorescent color images from input color images.

Printing System Initialization Modules (211).

An optional colorant selection module 212 creates the new fluorescent colorants 213 from an initially selected set of fluorescent inks (base colorants). From all superposition of two, three or possibly more fluorescent inks at various dot sizes, it selects first a white colorant having the highest possible intensity and being as achromatic as possible. It then selects one, two or more additional colorants which substantially extend the gamut formed by the base colorants (inks) and the white colorant. Note that this module is not absolutely necessary, since the new fluorescent colorants associated to an set of inks can be deduced offline in the laboratory of the fluorescent printer manufacturer.

In a preferred embodiment, the fluorescent gamut creation and mapping module 214 creates a tetrahedrized color gamut corresponding to the gamut of the selected fluorescent colorants, and associates to each tetrahedron vertex, thanks to the fluorescent color prediction model, color gamut colors to colorant surface coverages. It also maps input colors into the fluorescent colorant gamut, according to the method described in section "Gamut mapping from a full color space to the reduced fluorescent ink color space". It then fills the entries of a table 215 mapping input calorimetric values (e.g. CIELAB) to colorant surface coverages. This module needs not be incorporated in each fluorescent image printer, since, for creating the fluorescent color image, it is enough to have the juxtaposed halftoning module accessing the table mapping input colorimetric values to colorant surface coverages.

The juxtaposed halftoning initialization module 216 creates a juxtaposed screen element library 217 mapping colorant surface coverages to colorant screen elements, possibly comprising entries for ink halftone dots of a reduced size, see section "Creating a juxtaposed screen element library". This module needs not be incorporated in each fluorescent image printer, since, for creating the fluorescent color image, it is enough to have the juxtaposed halftoning module 218 accessing the juxtaposed screen element library 217 mapping colorant surface coverages to juxtaposed colorant screen elements.

The Juxtaposed Halftoning Module (218).

The juxtaposed halftoning module 218 traverses the output image space scan line by scan line and pixel by pixel and obtains for each pixel the corresponding input image location and its source image calorimetric values (from input color image 219). It then gets the respective fluorescent colorants and their surface coverages by accessing the table 215 providing the mapping between colorimetric values and colorant surface coverages. The screen tile within the juxtaposed screen element library 217 corresponding to the obtained colorant surface coverages is accessed, the colorant of the current pixel is read and copied to the current output fluorescent image pixel of the output fluorescent image 220. Relying on the generated output fluorescent image, the juxtaposed halftoning module then, depending on the printer technology, either sends for each printed pixel information about the pixel dot size of the contributing inks or sends the different ink layers separately to the printer. In the case of offset printing, the different ink layers are sent to the imaging device generating the films or the plates.

Advantages of the Proposed Method.

Figure 22:
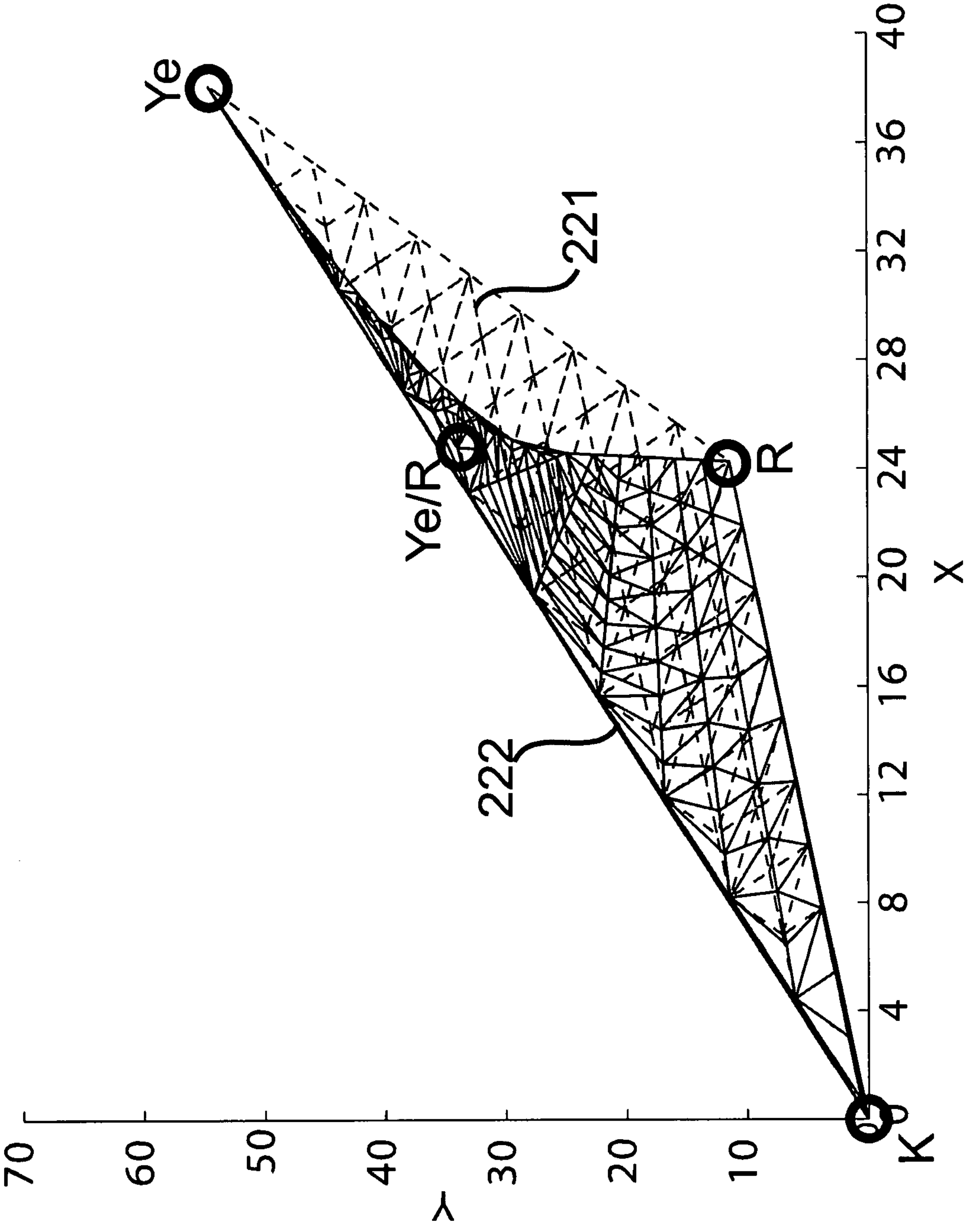
FIG. 22 shows the respective gamut surfaces projected on the XY space of the CIE-XYZ color space spanned by variations of the surface coverages of the yellow (Ye) and red (R) fluorescent inks, for respectively juxtaposed halftoning 221 and classical halftoning algorithms 222 whose screens are created independently of each other.

1. One of the problems of printing with fluorescent inks is the presence of quenching. Quenching has the effect of strongly reducing the light emitted by fluorescence, when the concentration of the fluorescent substance is too high. Therefore, the superposition of fluorescent inks generally induces quenching. For example, FIG. 22 shows that the superposition of yellow and red and fluorescent inks (Ye/R) yields a color which is located between the yellow ink color (Ye), the red ink color (R) and the background black color (K). Due to quenching, the full dot size superposition color is not the sum of the calorimetric values of respectively red and yellow, but a darkened instance of the most fluorescent of the two colors (see circle "Ye/R" on the plot). By using a printer capable of printing pixels at different pixel dot sizes, we are able, using middle and small pixel dot sizes, to reduce the apparent concentration of the fluorescent substance and therefore to reduce or avoid the quenching effects. In printing devices where the output colorant image is divided into ink layers and where each ink layer pixel is either printed or not (on/off mode), we reduce the apparent concentration of the fluorescent inks by printing them as ink halftone dots of reduced dot size, e.g. at ⅔ or ⅓ their full size, with the full size being their size as specified by their corresponding colorant surface coverages.

2. In order to create a spectral prediction system for printing with the fluorescent inks, we discovered that the spectral Neugebauer model adapted to juxtaposed fluorescent colorants provides adequate predictions. Since light emitted from one ink is not absorbed by other fluorescent inks, fluorescent emission is primarily an additive process. The Neugebauer spectral emission prediction model is calibrated by establishing a mapping between the nominal single colorant surface coverage and the single colorant effective surface coverage, for each contributing colorant. Thanks to the calibrated spectral emission prediction model, we can predict the emission spectrum for a given set of nominal surface coverages of two chromatic colorants, the white colorant and the unprinted black of the support. By converting emission spectra to colorimetric CIE-XYZ values and then to the CIELAB space, we obtain a relationship between fluorescent colorant surface coverages and CIELAB colorimetric values.

3. Input image colors are reproduced by mapping them into the fluorescent ink gamut. Lightness and hues are preserved as much as possible. Input color hues outside the target fluorescent ink gamut are mapped into gray or into strongly desaturated neighbor colors.

4. We disclose the juxtaposed halftoning method dedicated for creating juxtaposed colorant dots, where, in order to avoid overlapping between colorant dots, unprinted black is distributed between the juxtaposed colorant dots. This is carried out by creating modified colorant surface coverages each incorporating a fraction of the unprinted black surface. Colorants which have a modified surface larger than their initially allocated halftone dot cell space (⅓ for 3 colorants) spread out horizontally and vertically onto the neighboring colorants which require less than the initially allocated cell space. This way of growing the surface coverages ensures that the colorants requiring less than their nominal cell space form well-clustered quadratic halftone dots. After layout of the modified surface coverages of the colorants, each colorant surface is scaled down so as to recreate the initially specified black surface coverage of the support surrounding each of the juxtaposed screen dots. To be as less visible as possible, the juxtaposed screen orientation is diagonal, close to 45 or −45 degrees. A library of juxtaposed halftone screens is constructed, which contains one entry for each considered set of discrete dot surface coverages. In printing devices, where the output colorant image is divided into its ink layers and where individual ink layer pixels are printed in on/off mode, the juxtaposed screen element library is expanded by creating additional entries at each surface coverage for the correspondingly reduced ink halftone dot sizes.

5. In order to illustrate the advantage of juxtaposed halftoning for printing with invisible fluorescent inks, let us compare in FIG. 22 the color gamut 221 (dashed grid lines) that can be attained by juxtaposed halftoning with the gamut 222 (continuous grid lines) that can be attained with a conventional color halftoning algorithm, whose screen layers are created independently of each other (mutually rotated classical clustered-dot dithering, blue-noise dithering or color error-diffusion). In the present example, juxtaposed halftoning prints the base colorants red (R), yellow (Ye) and the unprinted black (K) side by side, i.e. the surface coverages r of base colorant red, y of base colorant yellow and k of colorant black (unprinted support) are varied between 0 and 1, with the condition r+y+k=1. The corresponding gamut 221, computed according the Neugebauer equation (1) and equation (4) converting emission spectra to CIE-XYZ is a barycentric combination of these colorants (a triangle in CIE-XYZ space, shown in the XY projection as a dashed grid 221). When the screen layers are created independently of each other, the generated colorants comprise all inks and ink superpositions with their surface coverages given by the Demichel equations [Wyble and Berns 2000]. In the present example, they comprise the surface coverage $yr_c=y*r$ of the superposition of inks yellow and red (colorant Ye/R), created with respective ink surface coverages r and y. They also comprise surface coverages $y_c=y*(1-r)$ of base colorant yellow, $r_c=r*(1-y)$ of base colorant red and $k_c=(1-r)*(1-y)$ of the black located between the printed dots. Again, the Neugebauer equation (1) is used for computing the halftone emission spectrum, which is then converted to CIE-XYZ. All variations of yellow and red surface coverages, i.e. $0<r<1$ and $0<y<1$, yield the smaller concavely curved color gamut 222, represented by a grid made of continuous lines.

6. The results show that fluorescent images visible only under UV light may be created with fluorescent inks emitting in different parts of the visible wavelength range. Even in the case where the fluorescent inks cover only part of the full color gamut, colorful consistent images may be produced.

7. Since invisible fluorescent inks emitting in the red, green and blue wavelength ranges start to become available on the market and may be printed either partially superposed, or side by side as in color displays, using at least one fluorescent ink having a color different from red, green and blue reinforces the protection of security documents. The presented gamut mapping and juxtaposed halftoning techniques required to create fluorescent color images with at least one non-RGB fluorescent ink make counterfeiting much more difficult. The reasons are two-fold: (a) standard scanners, respectively copiers, are not able to scan, respectively copy invisible fluorescent images and (b) commercially available printer characterization, color separation and color halftoning tools are not able to create high-quality defect-free fluorescent color images when at least one non-RGB fluorescent ink is used.

8. The colorant juxtaposed halftone screen may be laid out so as to have a low juxtaposed screen frequency in parts of the fluorescent halftoned image. Such a low frequency screen part enables seeing the colorants by the naked eye, thereby ensuring that among the fluorescent inks used to produce the printed fluorescent image, there is at least one fluorescent ink which differs from red, green and blue fluorescent inks.

9. A high frequency juxtaposed screen provides an increased protection against counterfeits, since a high registration printer is necessary in order to create colorant dots by superposition of variable size ink dots. In case of lacking registration accuracy, correspondingly sized ink dots may not overlap and therefore induce variations in quenching depending on the surrounding ink dots. Such variations in quenching may appear as undesired fluctuations in fluorescent color and/or intensity.

REFERENCES CITED

U.S. Patent References

U.S. Pat. No. 7,054,038, Method and apparatus for generating digital halftone images by multi color dithering, to Ostromoukhov V., Hersch R. D. (inventors), filed 4 Jan. 2000, issued May 30, 2006.

U.S. Pat. No. 7,005,166, Method for fluorescent image formation, print produced thereby and thermal transfer sheet thereof, to Narita, S., Eto, K. (inventors), filed Jun. 18, 2002, priority Jun. 19, 2001, issued Feb. 28, 2006.

U.S. patent application Ser. No. 10/818,058, Methods and ink compositions for invisibly printed security images having multiple authentication features, to Coyle, W. J., Smith, J. C, (inventors), filed Apr. 5, 2004, priority Apr. 4, 2003.

Other References

Bala, R. 2003, Device characterization. In [Sharma 2003a, see below], Sect. 5.10.3, pp 357-360.

Balasubramanian, R. 1999, Optimization of the spectral Neugebauer model for printer characterization, J. of Electronic Imaging, Vol. 8, No. 2, 156-166.

Chosson S. and Hersch R. D. 2002, Color Gamut Reduction Techniques for Printing with Custom Inks, Conf. Color Imaging: Device-Independent Color, Color Hardcopy, and Graphic Arts VII, SPIE Vol. 4663, 110-120, Emmel, P. 2003. Physical models for color predictions, In [Sharma 2003a], Chap. 3, 173-238

Hains, C., Wang, S.-G., AND Knox, K. 2003, Digital color halftones. In [Sharma 2003a], Chap. 6, 385-490.

MacDonald, L. W., Morovic, J., AND Xiao, K. 2000, A topographic gamut mapping algorithm based on experimental observer data. In Proc. of 8th IS&T/SID Color Imaging Conf., 311-317.

Moon, P., Spencer E., 1971, Field Theory Handbook, Springer-Verlag, $2^{nd}$ edition, pp. 51-75

Morovic, J. 2003, Gamut mapping. In [Sharma 2003a], Chap. 10, 639-685.
Nassau, K. 1983, The Physics and Chemistry of Color, John Wiley & Sons, pp. 70, 400-405.
Sharma, G. 2003a, Editor, Digital Color Imaging Handbook. CRC Press, 2003
Sharma, G. 2003b, Color fundamentals for digital imaging, in [Sharma 2003a], Chap. 1, 15-40.
Van Renesse, R. L. 2005, Optical Document Security, Artech House, London, England, pp. 97-102.
Wyble, D. R., Berns, R. S. 2000. A Critical Review of Spectral Models Applied to Binary Color Printing. Journal of Color Research and Application Vol. 25, No. 1, 4-19.

The invention claimed is:

1. A method for producing a fluorescent halftone color image which is invisible under daylight and visible under UV light, using fluorescent inks and superpositions of fluorescent inks as fluorescent emissive colorants, the method comprising the steps of (a) selecting a set of at least two fluorescent inks and superpositions of said fluorescent inks as base fluorescent emissive colorants invisible under daylight;

(b) by relying on emission spectra of said fluorescent emissive colorants, determining, using a color prediction model, under ultraviolet illumination the gamut produced by juxtaposed halftones of said fluorescent emissive colorants in a colorimetric space, and with said color prediction model creating correspondences between emitted colorimetric values and surface coverages of said fluorescent emissive colorants;

(c) obtaining gamut mapped input image colors located inside the gamut formed by said fluorescent emissive colorants by gamut mapping of said input image colors into said gamut;

(d) converting said gamut mapped input image colors into colorant surface coverages using said correspondences between said emitted device-independent colorimetric values and said fluorescent emissive colorant surface coverages; and (e) creating fluorescent color screens invisible under daylight according to said colorant surface coverages by juxtaposed halftoning, (i) creating side by side surfaces of said fluorescent emissive colorants according to ratios of their surface coverages;

(ii) rasterizing said side by side surfaces of the fluorescent emissive colorants into juxtaposed emissive colorant halftones and inserting them according to their surface coverages into corresponding juxtaposed screen element library entries; and (iii) during the creation of said fluorescent halftone color image, accessing according to said emissive halftone colorant surface coverages said corresponding juxtaposed screen element library entries and retrieving the emissive halftone colorant to be printed at a current position; and where side by side surfaces of said fluorescent emissive colorants maximize the range of emitted intensities and saturations of said emissive colorant halftone colorants by avoiding undesired colorant superpositions yielding quenching effects which may reduce and distort emitted colorant colors.

2. The method of claim 1, where, in order to avoid quenching effects, said fluorescent emission colorants are obtained by superpositions of at least one fluorescent ink printed at a reduced dot size, and where the reduced dot size is selected from a set of reduced pixel dot size and reduced halftone dot size.

3. The method of claim 1, where the selected set of fluorescent inks comprises at least one fluorescent ink which differs from red, green, blue and white fluorescent inks, where the emitted colorimetric values associated to each fluorescent colorant are measured under UV light by a device selected from a set of colorimetric measurement devices and spectral measurement devices and where the color prediction model is based on the additivity of the contributing fluorescent colorants.

4. The method of claim 1, where the selected set of fluorescent inks comprises at least one fluorescent ink which differs from red, green blue and white fluorescent inks, where the colorimetric values associated to each fluorescent colorant are measured under UV light by a spectral measurement device and where the color prediction model is a spectral emission prediction model comprising also a conversion from emission spectra to colorimetric values.

5. The method of claim 1, where said gamut mapping of said input image colors into the fluorescent emissive colorant gamut comprises a projection of out-of-gamut colors whose hues are not within the fluorescent ink gamut into neighboring in-gamut colors.

6. The method of claim 1 where creating said side by side surfaces of said fluorescent emissive colorants according to ratios of their surface coverages comprises computing how much surfaces of individual colorants spread out into neighboring cells.

7. The method of claim 6, where the fluorescent emissive colorant surfaces are laid out by distributing the remaining unprinted space between the individual colorant surfaces, thereby further reducing a possible quenching interaction between different colorant dots.

8. The method of claim 6, where an output image screen formed by the fluorescent emissive colorants of the fluorescent color image comprises juxtaposed screen dots of said colorants having different frequencies, with low frequency screen dots allowing one to see under UV, for authentication purposes, their individual colors with the naked eye.

9. The method of claim 8, where the juxtaposed screen dots having different frequencies are obtained by a two-dimensional geometric transformation between said output image screen and an original juxtaposed screen, thereby creating a juxtaposed screen made of juxtaposed screen elements of smoothly increasing sizes.

10. A fluorescent color image viewable under UV light produced according to the method of claim 1.

11. An item selected from the set of security documents and valuable articles comprising a fluorescent color image according to claim 10, the set of security document and valuable articles comprising bank notes, passports, identity cards, entry tickets, travel documents, checks, vouchers, valuable business documents as well as CDs, DVDs, software packages, medical drugs, watches, bottles, personal care articles, fashion articles, clothes, posters, publicity displays and items of commercial art.

12. An item as set forth in claim 11, where a same color image is rendered within the same space as a color image visible under daylight and as a color image visible under UV light by tiling said space into a first part allocated to said color image visible under daylight and into a second part allocated to said color image visible under UV light.

13. A computing system for the creation of a fluorescent output color image visible only under UV light comprising fluorescent color image software creation modules readable and executable from the computing system's memory, said software modules comprising a fluorescent gamut creation and mapping module operable for filling entries of a table mapping input colorimetric values to fluorescent emission colorant surface coverages by relying on a model predicting the color of fluorescent emissive colorant halftones and further comprising a juxtaposed halftoning module operable for (a) creating side by side surfaces of fluorescent emissive colorants according to ratios of their surface coverages;

(b) rasterizing said side by side surfaces of the fluorescent emissive colorants into juxtaposed emissive colorant halftones and inserting them according to their surface coverages into corresponding juxtaposed screen element library entries; and (c) during the creation of said fluorescent halftone color image, operable for performing the following steps:

(i) deducing, at each current pixel of the fluorescent output color image, a corresponding input image location and its source image color;

(ii) obtaining colorant surface coverages of contributing colorants for reproducing that source image color by accessing said table mapping input colorimetric values to said fluorescent emission colorant surface coverages;

(iii) accessing according to said fluorescent emission colorant surface coverages a juxtaposed screen element at a corresponding juxtaposed screen element library entry, reading a colorant and copying it into the current fluorescent output color image pixel; and (iv) deducing from the fluorescent output color image an information that is used for printing, which, depending on target printer type, comprises elements selected from the group of ink pixel dot size information and ink layer pixel on/off information.

14. The computing system of claim 13, where said juxtaposed halftoning module avoids overlapping between colorant dots due to possible misregistration by distributing unprinted black around fluorescent emissive colorant dots, by (a) creating modified colorant surface coverages each incorporating a fraction of the unprinted black surface;

(b) spreading out colorants having a modified surface larger than an initially allocated halftone dot cell space onto neighboring colorants requiring less than the initially allocated cell space and at the same time keeping their ratios of original surface coverages;

(c) scaling down the surface of each colorant so as to recreate the initially specified imprinted black surface coverage surrounding each of said fluorescent emissive colorant dots; and (d) rasterizing the colorant surfaces and storing them according to their respective surface coverages into said juxtaposed screen element library entries.

* * * * *